United States Patent
Jung et al.

(10) Patent No.: US 10,194,316 B2
(45) Date of Patent: Jan. 29, 2019

(54) METHOD OF CHANGING PROFILE USING IDENTIFICATION MODULE AND ELECTRONIC DEVICE IMPLEMENTING SAME

(71) Applicant: Samsung Electronics Co., Ltd., Suwon-si, Gyeonggi-do (KR)

(72) Inventors: Euichang Jung, Seoul (KR); Suha Yoon, Seoul (KR); Suyoung Park, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 14/920,338

(22) Filed: Oct. 22, 2015

(65) Prior Publication Data

US 2016/0119780 A1   Apr. 28, 2016

(30) Foreign Application Priority Data

Oct. 27, 2014   (KR) .......................... 10-2014-0146455

(51) Int. Cl.
*H04W 8/26* (2009.01)
*H04W 8/20* (2009.01)

(52) U.S. Cl.
CPC ........... *H04W 8/265* (2013.01); *H04W 8/205* (2013.01)

(58) Field of Classification Search
CPC .............................. H04W 8/205; H04W 12/06
USPC .......... 455/419, 411, 418, 456.1, 432.1, 457, 455/413
See application file for complete search history.

(56) References Cited

U.S. PATENT DOCUMENTS

| | | | |
|---|---|---|---|
| 8,219,148 B2 | 7/2012 | Amiel et al. | |
| 2006/0205434 A1 | 9/2006 | Tom et al. | |
| 2008/0167033 A1* | 7/2008 | Beckers | ................ H04L 12/66 455/432.3 |
| 2009/0117875 A1 | 5/2009 | Weigele et al. | |

(Continued)

FOREIGN PATENT DOCUMENTS

| | | |
|---|---|---|
| EP | 1 703 760 A2 | 9/2006 |
| EP | 2 448 301 A1 | 5/2012 |

(Continued)

OTHER PUBLICATIONS

GSM Association, "Embedded SIM Remote Provisioning Architecture", GSM Association Official Document 12FAST.13 V1.1 [online], Dec. 17, 2013.

*Primary Examiner* — Kiet M Doan
(74) *Attorney, Agent, or Firm* — Jefferson IP Law, LLP

(57) ABSTRACT

A method of changing a profile by using an identification module and an electronic device for implementing the same are provided. The electronic device may enable a profile stored in an embedded identification module to receive a wireless communication network service corresponding to the enabled profile. The method includes identifying a network selected by a user, determining whether a profile, which can use the network, is included in the identification module in accordance with the identified network, downloading the profile corresponding to the network and enabling the downloaded profile when the profile is not included in the identification module, enabling the profile when the profile is included in the identification module, and making a connection to the network based on the enabled profile.

19 Claims, 23 Drawing Sheets

(56) References Cited

U.S. PATENT DOCUMENTS

| | | |
|---|---|---|
| 2011/0019605 A1* | 1/2011 | Ma .......................... H04W 4/06 370/312 |
| 2011/0130118 A1 | 6/2011 | Fan et al. |
| 2012/0108206 A1 | 5/2012 | Haggerty |
| 2012/0331292 A1 | 12/2012 | Haggerty et al. |
| 2013/0231087 A1 | 9/2013 | O'Leary |
| 2014/0087790 A1 | 3/2014 | Babbage et al. |
| 2014/0228039 A1 | 8/2014 | Zhao et al. |
| 2015/0350881 A1 | 3/2015 | Weiss et al. |
| 2015/0163056 A1* | 6/2015 | Nix ....................... H04L 9/0869 380/46 |
| 2015/0237551 A1 | 8/2015 | Jin et al. |
| 2015/0271173 A1 | 9/2015 | Seo et al. |

FOREIGN PATENT DOCUMENTS

| | | |
|---|---|---|
| EP | 2 555 547 A1 | 2/2013 |
| EP | 2 773 077 A1 | 9/2014 |
| EP | 2 916 590 A1 | 9/2015 |
| GB | 2 485 433 A | 5/2012 |
| WO | 2011-080637 A1 | 7/2011 |
| WO | 2014-035092 A1 | 3/2014 |
| WO | 2014-067093 A1 | 5/2014 |
| WO | 2014-095040 A1 | 6/2014 |

* cited by examiner

FIG. 7B

| App Store (730) | | App Store (740) | |
|---|---|---|---|
| > USA | | > AT&T WiFi | |
| AT&T WiFi | | 1 Day | 0.99$ |
| AT&T 3G/LTE | | 1 Week | 4.99$ |
| AT&T eMBMS | | 1 Month | 9.99$ |
| Verizon WiFi | | Extension | |
| Verizon 3G/LTE | | 1 G byte | 0.99$ |
| Verizon eMBMS | | 5 G byte | 4.99$ |
| AT&T + Verizon WiFi | | 10 G byte | 9.99$ |

METHOD OF CHANGING PROFILE USING IDENTIFICATION MODULE AND ELECTRONIC DEVICE IMPLEMENTING SAME

CROSS-REFERENCE TO RELATED APPLICATION(S)

This application claims the benefit under 35 U.S.C. § 119(a) of a Korean patent application filed on Oct. 27, 2014 in the Korean Intellectual Property Office and assigned Serial number 10-2014-0146455, the entire disclosure which is hereby incorporated by reference.

TECHNICAL FIELD

The present disclosure relates to a method of changing a profile by using an identification module and providing a wireless communication service based on the changed profile, and an apparatus implementing the same.

BACKGROUND

A universal integrated circuit card (UICC), which is one of the identification modules, corresponds to a smart card that is inserted into an electronic device to provide a particular service. The UICC may include a subscriber identification module (SIM) card. The UICC may store personal information on a mobile communication subscriber and, when the electronic device accesses a wireless communication network, authenticate the subscriber and generate a traffic security key, thereby enabling the safe use of wireless communication. The subscriber may be a user who subscribes to a particular wireless communication service provider which provides the wireless communication network.

In general, by a request from the particular wireless communication service provider, the UICC is manufactured as a dedicated card based on the particular wireless communication service provider, and is released while including authentication information for the corresponding service provider's access to the network, for example, a universal subscriber identity module (USIM) application, an international mobile subscriber identity (IMSI), and an authentication key value. Further, the communication service provider may provide the released UICC to the subscriber. The UICC may be used for installing, modifying, and removing an application from the UICC based on a technology, such as over the air (OTA) according to a request signal from the user and the communication service provider. The subscriber may insert the UICC received from the communication service provider into the electronic device to use a network and an application service of the corresponding wireless communication service provider. Further, when the user changes the electronic device, by extracting the UICC from the electronic device and inserting the extracted UICC into a new electronic device, the user may use the existing authentication information, mobile communication phone numbers, and a personal phone book pre-stored in the UICC in the new electronic device.

In general, a UICC has an attachable/detachable type, and may include a SIM card. A normal UICC has a particular communication service provider preset thereto and may be used in accordance to a wireless communication network service provided by the communication service provider. For example, the attachable/detachable UICC of the related art is independent of a particular communication service provider and, when desiring to use a service provided from another communication service provider, requires another attachable/detachable UICC corresponding to the other communication service provider. Accordingly, the user may feel difficulty in using services provided from other communication service providers. For example, when the user desires to use only a service provided by a particular communication service provider, the user has difficulty with changing the UICC and has danger of losing the UICC.

Therefore, a need exists for a method of changing a profile by using an identification module and providing a wireless communication service based on the changed profile, and an apparatus implementing the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that has a universal integrated circuit card (UICC) therein, and may change a profile that can provide a wireless communication network service through the embedded UICC (eUICC).

More specifically, the electronic device may download a profile provided by each communication service provider and enable the profile. Further, the electronic device may provide the user with a wireless communication network service of the communication service provider corresponding to the profile based on the enabled profile.

In accordance with an aspect of the present disclosure, a method of changing a profile by using an identification module is provided. The method includes identifying a network selected by a user, determining whether the profile, which uses the network, is included in the identification module in accordance with the identified network, downloading the profile corresponding to the network and enabling the downloaded profile when the profile is not included in the identification module, enabling the profile when the profile is included in the identification module, and making a connection to the network based on the enabled profile.

In accordance with another aspect of the present disclosure, an electronic device for changing a profile by using an identification module is provided. The electronic device includes a communication module configured to download a profile and make a connection to a network, an identification module configured to store the downloaded profile, and a processor configured to identify the network, determine whether a profile, which uses the network, is included in the identification module in accordance with the identified network, download the profile corresponding to the network and enable the downloaded profile when the profile is not included in the identification module, enable the profile when the profile is included in the identification module, and make a connection to the network based on the enabled profile.

In accordance with another aspect of the present disclosure, a method of changing a profile by using an identification module and an electronic device for implementing the same is provided. The method includes an eUICC, which is one of identification modules, embedded therein. Through the embedded eUICC, the electronic device can provide a user with not only a wireless communication network service provided by a communication service provider, to which the electronic device has subscribed, but also a wireless communication network service provided by another communication service provider. The electronic device according to the present disclosure can download a profile corresponding to the other communication service provider based on the eUICC and enable the downloaded profile. Based on the enabled profile, the electronic device can use the wireless communication network service provided by the communication service provider corresponding to the profile. For example, the electronic device can change the communication service provider based on the embedded eUICC, thereby further increasing user convenience. For example, when a user who has subscribed to a communication service provider (communication service operator) A desires to use a network service provided by a communication service provider B, the electronic device can download a profile corresponding to the communication service provider B and use the network service provided by the communication service provider B based on the profile. For example, the electronic device can store one or more profiles in the embedded eUICC and enable the stored profiles, so as to use various network services provided by communication service providers corresponding to the profiles. Accordingly, the user can more conveniently use various services provided by other communication service providers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, and 7C illustrate download-related information on a profile displayed on a display unit according to various embodiments of the present disclosure;

Throughout the drawings, it should be noted that like reference numbers are used to depict the same or similar elements, features, and structures.

DETAILED DESCRIPTION

Figure 1:
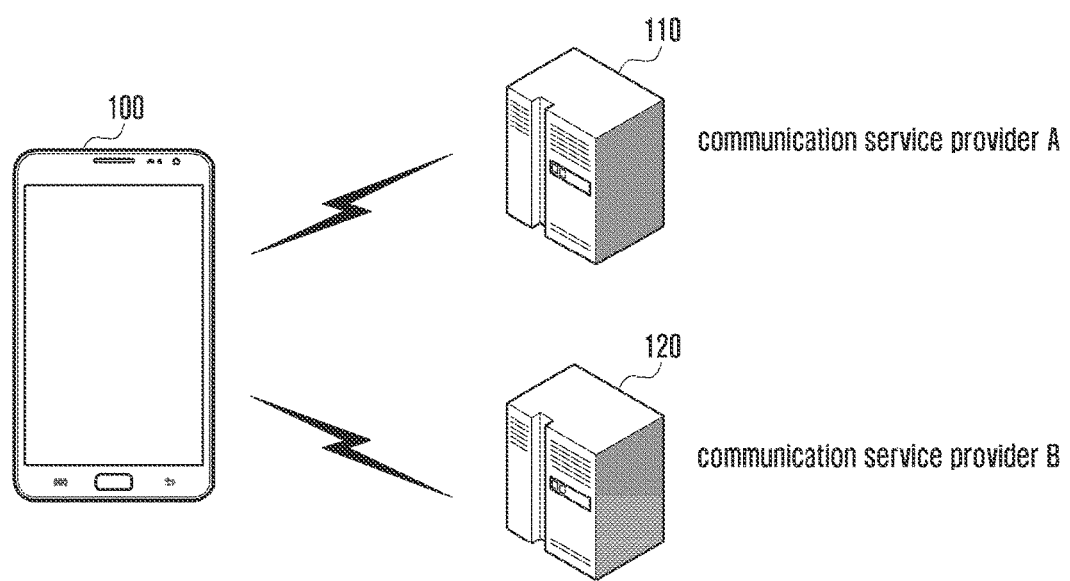
FIG. 1 is a diagram illustrating a communication in which an electronic device provides a wireless communication network service through a communication service provider server according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that the expressions "comprises" and "may comprise" is used to specify presence of disclosed function, operation, component, and the like, but do not preclude the presence of one or more functions, operations, components, and the like. It will be further understood that the terms "comprises" and/or "has" when used in this specification, specify the presence of stated feature, number, operation, component, element, or a combination thereof but do not preclude the presence or addition of one or more other features, numbers, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms, such as "first," "second," and the like, are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The expression "wireless communication network service" used in various embodiments refers to a service that, for transmission/reception of data and signals between the electronic device and another electronic device, wirelessly connects the electronic devices. A wireless communication network service may be provided based on a server of a particular communication service provider, and may be generally provided to an electronic device subscribing to the particular communication service provider.

The expression "profile" used in various embodiments of the present disclosure may be data that is generated, by the user, by packaging information required for using a network service provided by a particular communication service provider. The electronic device may use the network service provided by the particular communication service provider based on a profile corresponding to the particular communication service provider. For example, a profile A corresponding to a communication service provider A is needed to use a network service provided by the communication service provider A. The profile may exist according to each communication service provider, and each communication service provider may determine whether the electronic device can use the network service based on the profile enabled in the electronic device.

The expression "changing a profile" used in various embodiments of the present disclosure may refer to enabling a particular profile among profiles stored in the electronic device. The change in the profile may refer to a change in a communication service provider (e.g., a communication service operator) from which the user receives the wireless communication network service. For example, each communication service provider has a used profile, and the electronic device may download a profile corresponding to the communication service provider A and enable the downloaded profile. Further, the electronic device may receive a wireless communication network service from the communication service provider A based on the enabled profile.

The terminology used herein is for the purpose of describing particular embodiments of the present disclosure only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include a smartphone, a table personal computer (PC), a mobile phone, a video phone, an electronic book (e-book) reader, a desktop PC, a laptop PC, a netbook computer, a personal digital assistant (PDA), a portable multimedia player (PMP), a moving picture experts group (MPEG-1 or MPEG-2) audio layer-3 (MP3) player, a mobile medical appliance, a camera, a wearable device (e.g., a head-mounted device (HMD), such as electronic glasses, an electronic clothing, an electronic bracelet, an electronic necklace, an electronic appcessory, an electronic tattoo, a smartwatch, and the like.

According to an embodiment of the present disclosure, the electronic device may be one of smart home appliances having operation support function. Examples of the smart electronic appliance as an electronic device may include a television, a digital versatile disc (DVD) player, an audio player, a refrigerator, an air-conditioner, a vacuum cleaner, an electronic oven, a microwave oven, a laundry machine, an air cleaner, a set-to box, a TV box (e.g., Samsung HomeSync™, Apple TV™, and Google TV™), a game console, an electronic dictionary, an electronic key, a camcorder, an electronic frame, and the like.

According to an embodiment of the present disclosure, examples of the electronic device may include a medical device (e.g., magnetic resonance angiography (MRA), magnetic resonance imaging (MRI), computed tomography (CT)), a navigation device, a global positioning system (GPS) receiver, an event data recorder (EDR), a flight data recorder (FDR), a car infotainment device, a maritime electronic device (e.g., a maritime navigation device and a gyro compass), an aviation electronic device (avionics), a security device, a vehicle head unit, an industrial or a home robot, an automatic teller's machine (ATM) of financial institution, a point of sales (POS), and the like.

According to an embodiment of the present disclosure, examples of the electronic device may include furniture and building/structure having a communication function, an electronic board, an electronic signature receiving device, a projector, and a metering device (e.g., water, electric, gas, and electric wave metering devices). According to various embodiments of the present disclosure, the electronic device may be any combination of the aforementioned devices.

According to various embodiments of the present disclosure, the electronic device may be a flexible device. It is obvious to those skilled in the art that the electronic device is not limited to the aforementioned devices.

Descriptions are made of the electronic devices according to various embodiments of the present disclosure with reference to accompanying drawings hereinafter. The term 'user' used in various embodiments of the present disclosure may denote a person or a device (e.g., an artificial intelligent electronic device) using the electronic device.

FIG. 1 is a diagram illustrating a communication in which an electronic device provides a wireless communication network service through a communication service provider server according to various embodiments of the present disclosure.

Referring to FIG. 1, an electronic device 100 may use a wireless communication network service through a server of a particular communication service provider (e.g., a communication service provider A 110 and a communication service provider B 120). The electronic device 100 may include a universal integrated circuit card (UICC) to communicate with an external electronic device (e.g., the server) and use a wireless communication network service provided by a particular communication service provider corresponding to the UICC. The UICC corresponds to an IC card that implements an identification module for the use of the service provided by the particular communication service provider and may include a subscriber identification module (SIM) card. Hereinafter, the above described UICC and embedded UICC (eUICC) are cards that implement the identification module and may be referred to as the identification module. For example, the electronic device 100 may use a wireless communication network service based on the communication service provider A 110 or the communication service provider B 120, but can use the wireless communication network service only when including a UICC corresponding to each communication service provider. The UICC may be manufactured based on the communication service provider, and may be determined by the communication service provider when manufactured or determined by each communication service provider based on a profile provided by the communication service provider after the manufacture. In general, based on one UICC, the electronic device 100 may use a wireless communication network service provided by a particular communication service provider corresponding to the UICC. For example, when the electronic device 100 has subscribed to the communication service provider A 110, the electronic device 100 may use a network service provided by the communication service provider A 110 based on a profile corresponding to the communication service provider A 110. The electronic device 100 according to various embodiments of the present disclosure may have one eUICC corresponding to one of the above described UICCs, and use the wireless communication network service while changing the profile based on the embedded eUICC. For example, even in the case of a communication service provider to which the electronic device 100 has not subscribed, the electronic device 100 may use a network service provided by the communication service provider, to which the electronic device 100 has not subscribed, based on a profile corresponding to the communication service provider to which the electronic device 100 has not subscribed.

Figure 2:
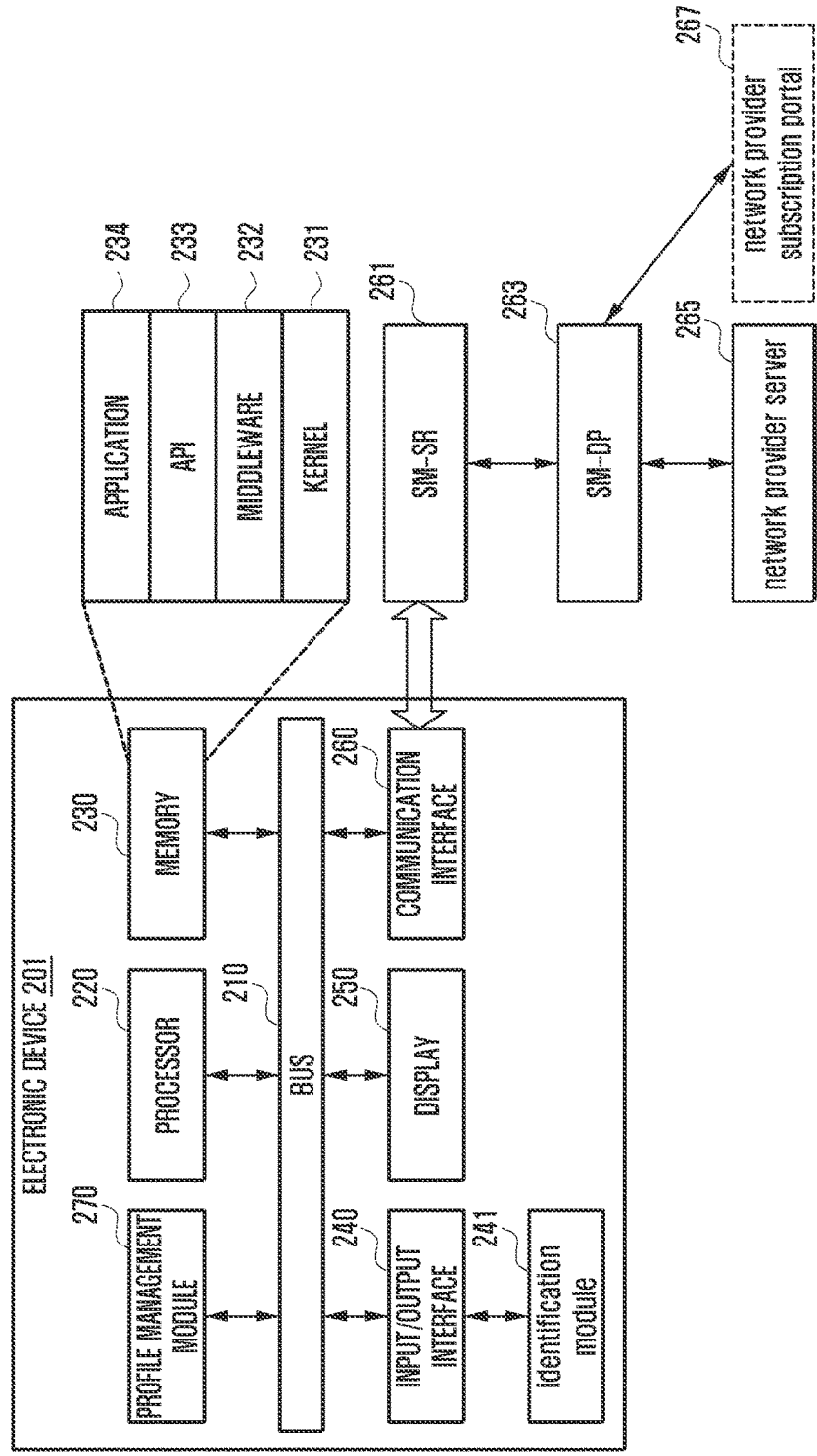
FIG. 2 is a block diagram of an electronic device according to various embodiments of the present disclosure.

FIG. 2 is a diagram illustrating a network environment including electronic devices according to an embodiment of the present disclosure.

Referring to FIG. 2, an electronic device 201 may include a bus 210, a processor 220, a memory 230, an input/output interface 240, an identification module 241, a display 250, a communication interface 260, and an operation module 270.

The bus 210 connects the aforementioned components to each other and may be a circuit of exchanging signals (e.g., control messages) among the components.

For example, the processor 220 may receive commands from the aforementioned other components (e.g., the memory 230, the input/output interface 240, the identification module 241, the display 250, the communication interface 260, and the profile management module 270) through the bus 210, decipher the received commands, and perform calculations or data processing according to the deciphered commands. The processor 220 according to the present disclosure may generally control general operations of the electronic device 201. Further, the processor 220 may include the profile management module 270. Although not illustrated, a communication processor (CP) for performing wireless communication may be included in the processor 220. Alternatively, the CP is separately included in the electronic device 201 and allows the electronic device 201 to receive a wireless communication network service under a control of the processor 220. The processor 220 of the electronic device 201 according to various embodiments of the present disclosure may determine a communication service provider based on a profile stored in the identification module 241 and receive the wireless communication network service through the determined communication service provider.

The memory 230 may store the command or data received from the processor 220 or other components (e.g., the input/output interface 240, the identification module 241, the display 250, the communication interface 260, the profile management module 270, and the like) or generated by the processor 220 or other components. The memory 230 may store program modules including a kernel 231, a middleware 232, an application programming interface (API) 233, applications 234, and the like. Each programing module may be implemented as software, firmware, hardware, and any combination thereof.

More specifically, the memory 230 performs a function of storing downloaded multimedia contents, user data generated by the user, a short message received from an external server, or a multimedia message as well as an application program required for operations of the functions of the above described components. The memory 230 according to various embodiments of the present disclosure may store a profile for receiving the wireless communication network service from the server of the communication service provider. The memory 230 may be configured in the form of a memory chip included in the electronic device 201, and may be implemented in a particular space within the identification module 241, that is, the SIM card. Further, the memory 230 may store information on eUICC IDs (EIDs), public land mobile network IDs (PLMN IDs), and uniform resource locators (URLs) of network providers (e.g., communication service providers). In addition, the memory 230 may store applications (e.g., application programs) installed in the electronic device 201. The application may be linked to the network provider server 265, and may induce additional application installation through a link with another service provider server related to the network provider. Further, the application may be linked to the network provider subscription portal 267. For example, the application may be linked to a server of an electronic device manufacturer, linked to a server of an eUICC manufacturer, or linked to both servers. In other words, the application may access the network provider server 265 or the network provider subscription portal 267 according to a control of the processor 220, and provide functions for transmitting subscription-related information to the network provider subscription portal 267.

The memory 230 may include at least one type of storage medium of a flash memory type, a hard disk type, a multimedia card micro type, a card type memory (e.g., a secure digital (SD) memory, an extreme digital (XD) memory, and the like), a random access memory (RAM), a static RAM (SRAM), a read-only memory (ROM), an electrically erasable programmable ROM (EEPROM), a PROM, a magnetic memory, a magnetic disk, and an optical disk.

The kernel 231 may control or manage the system resources (e.g., the bus 210, the processor 220, and the memory 230) for use in executing the operation or function implemented with the middleware 232, the API 233, or the applications 234. The kernel 231 also may provide an interface allowing the middleware 232, the API 233, or the applications 234 to access the components of the electronic device 201 to control or manage.

The middleware 232 may work as a relay of data communicated between the API 233 or applications 234 and the kernel 231. The middleware 232 may execute control of the task requests from the applications 234 in such a way of assigning priority for use of the system resource (e.g., the bus 210, the processor 220, and the memory 230) of the electronic device 201 to at least one of the applications 234.

The API 233 is the interface for the applications 234 to control the function provided by the kernel 231 or the middleware 232 and may include at least one interface or function (e.g., a command) for a file control, a window control, an image control, a text control, and the like.

According to various embodiments of the present disclosure, the applications 234 may include a short messaging service/multimedia messaging service (SMS/MMS) application, an email application, a calendar application, an alarm application, a health care application (e.g., an application of measuring quantity of motion or blood sugar level), and an environmental information application (e.g., atmospheric pressure, humidity, and temperature applications). Additionally or alternatively, the applications 234 may be an application related to information exchange between the electronic device 201 and other external electronic device (e.g., the electronic device 204). Examples of the information exchange application may include a notification relay application for relaying specific information to the external electronic device and a device management application for managing the external electronic device.

The input/output interface 240 delivers the command or data input by the user through with an input/output device (e.g., a sensor, a keyboard, and a touchscreen) to the processor 220, the memory 230, the communication interface 260, and/or the profile management module 270 through the bus 210. For example, the input/output interface 240 may provide the processor 220 with the data corresponding to the touch may by the user on the touchscreen. The input/output interface 240 may output the command or data (which is received from the processor 220, the memory 230, the communication interface 260, or the operation module 270 through the bus 210) through the input/output device (e.g., a speaker and a display). For example, the input/output interface 240 may output the voice data processed by the processor 220 to the user through the speaker.

The identification module 241 may include authentication information for network access of the communication service provider, for example, a universal subscriber identity module (USIM) application, an international mobile subscriber identity (IMSI), and an authentication key value. Hereinafter, the identification module 241 may be described as a UICC or a eUICC, and the eUICC may be a UICC that is embedded in the electronic device 201 and thus is not detachable. The identification module 241 may include a SIM card. The identification module 241 may include authentication information for receiving a wireless communication network service and transmit the authentication information to the profile manager 261 under a control of the processor 220. More specifically, the identification module 241 may have the form of a chip, such as the SIM card, and store the authentication information in a particular space within the identification module 241. For example, the identification module 241 may include authentication information by which the electronic device 201 can access the wireless communication network through the network provider server 265.

The display 250 may display various pieces of information (e.g., multimedia data or text data) for the user. The display 250 according to the present disclosure may display pieces of information required for the operation of the electronic device 201. The display 250 may be configured by a liquid crystal display (LCD) and, when the LCD is formed in a touch screen type, may be an input unit. More particularly, the display 250 according to the present disclosure may display an image through which a profile corresponding to the communication service provider can be purchased. For example, the display 250 may display a purchase image of the profile through which the electronic device 201 can receive the wireless communication network service from the communication service provider.

The communication interface 260 may include one or more components enabling wireless communication between the electronic device 201 and the wireless communication system or wireless communication between the electronic device 201 and a network in which another electronic device is located.

The profile management module 270 may store the profile downloaded from the communication service provider server (e.g., the network provider server 265) in the identification module 241 and determine whether to enable or disable the profile. For example, when the profile A among the profiles stored in the identification module 241 is enabled, the profile management module 270 may change a state of the existing enabled profile into a disabled state and change a state of the profile A into an active state. Alternatively, the profile management module 270 may enable the profile A together with the existing enabled profile. For example, the profile management module 270 may simultaneously enable two profiles. The processor 220 of the electronic device 201 may receive a wireless communication network service from a communication service provider corresponding to the enabled profile based on the enabled profile.

Further, the electronic device 201 may be connected to the network provider server 265 and the network provider subscription portal 267 through the profile manager (subscription manager secure routing: SM-SR) 261 and the profile provider (subscription manager data preparation: SM-DP) 263. The network provider server or the network provider subscription portal may be operated by the communication service provider. The SM-SR 261 may manage profiles so that the profiles corresponding to various communication service providers can be transferred to the identification module 241 embedded in the electronic device 201. The SM-DP 263 may operate together with the SM-SR 261, and receive profile-related information through the network provider server 265 and transmit the information to the SM-SR 261.

For example, the SM-SR 261 may receive profile-related information from the SM-DP 263, and accurately route and transfer the information to the corresponding identification module. The network provider mobile network operator: (MNO) may be a particular communication service provider, an electronic device manufacturer, or an identification module manufacturer, and the network provider server 265 and the network provider subscription portal 267 may be operated by the aforementioned providers. Further, the MNO may manage the enabled profile and the disabled profile separately. Further, the network provider subscription portal 267 refers to an Internet site through which the user of the electronic device 201 can subscribe to the MNO. The network provider subscription portal 267 may be operated by the MNO and may be provided by the network provider server 265.

Figure 3:
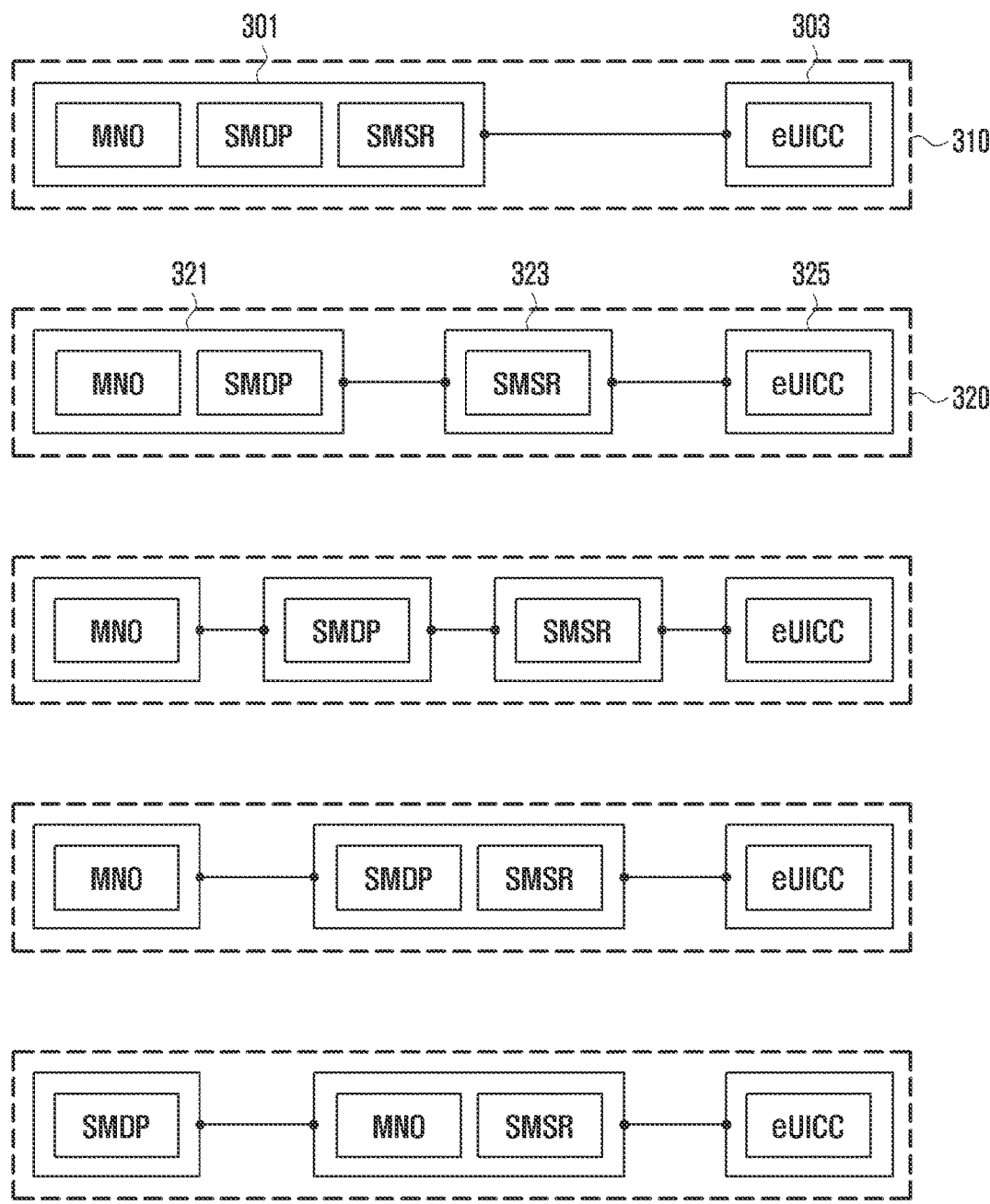
FIG. 3 illustrates a method of distributing roles of a profile manager (a subscription manager secure routing (SMSR)) and a profile provider (a subscription manager data preparation (SMDP)) according to various embodiments of the present disclosure.

FIG. 3 illustrates a method of distributing roles of a profile manager (SMSR or SM-SR) and a profile provider (SMDP or SM-DP) according to various embodiments of the present disclosure.

Referring to FIG. 3, in generating, downloading, and using a profile for the use of a network service, entities for performing roles may be a communication service provider, a UICC manufacturer, and an electronic device manufacturer. The entities may perform their roles in the generation, download, and use of the profile. The roles may correspond to the network provider (MNO), the profile manager (SM-SR), the profile provider (SM-DP), and the eUICC. For example, the network provider may serve to provide a network to allow the electronic device 201 to perform wireless communication. The network may be a network from which the profile can be downloaded, but is not limited thereto. The profile provider (SM-DP) may serve to generate a particular profile based on the eUICC, and the profile manager (SM-SR) may serve to manage the generated particular profile. For example, the entities may perform some of the aforementioned roles. The roles are divided in four roles herein, but are not limited thereto.

Referring to FIG. 3, although the performance of the aforementioned roles by the entities has five examples, the present disclosure is not limited thereto. For example, in a first example 310 of the examples illustrated in FIG. 3, the communication service provider may perform all roles 301 corresponding to the network provider (MNO), the profile manager (SM-SR), and the profile provider (SM-DP), and the UICC manufacturer may perform a role 303 corresponding to the eUICC. More specifically, the UICC manufacturer may manufacture the eUICC such that authentication information is stored in the eUICC. The communication service provider may generate a particular profile based on the authentication information stored in the eUICC, manage the generated particular profile, and transmit the profile to the electronic device 201. For example, the communication service provider may integrally perform a series of process described above. In a second example 320 of the examples illustrated in FIG. 3, the communication service provider may perform roles 321 corresponding to the network provider (MNO), and the profile provider (SM-DP), and the electronic device manufacturer may perform a role 325 corresponding to the profile manager (SM-SR) 323. The UICC manufacturer may perform a role 303 corresponding to the eUICC. As described above, the entities (the communication service provider, the UICC manufacturer, and the electronic device manufacturer) may perform particular roles according to a wireless communication environment and the performance of the roles is not limited to the examples illustrated in FIG. 3. The examples for distributing the roles illustrated in FIG. 3 are only some of the various embodiments of the present disclosure, and other roles may be added.

Figure 4:
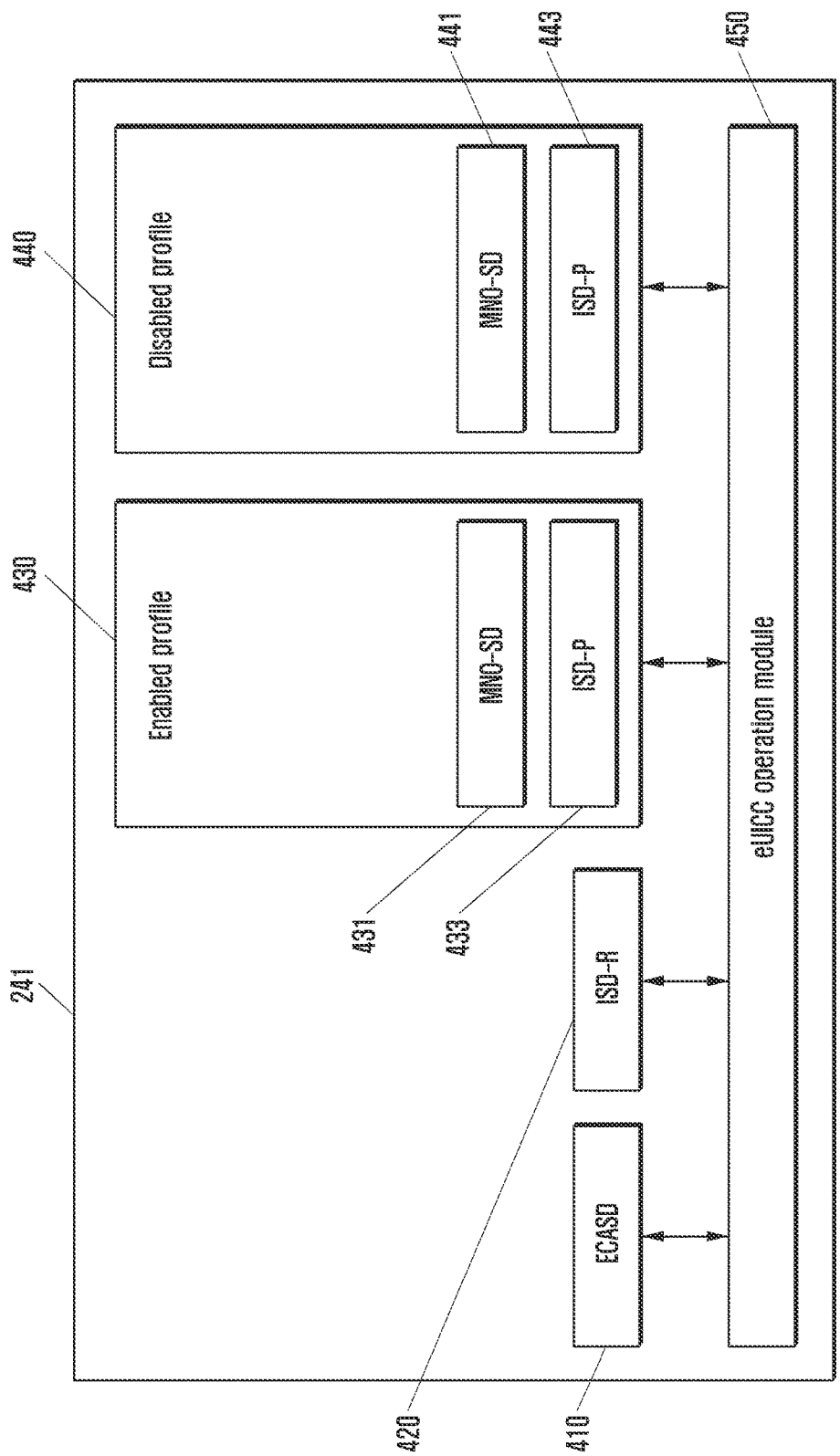
FIG. 4 illustrates an internal configuration of an embedded universal integrated circuit card (eUICC) according to various embodiments of the present disclosure.

FIG. 4 illustrates an internal configuration of an eUICC according to various embodiments of the present disclosure.

Referring to FIG. 4, the identification module 241 may include an eUICC certificate authority security domain (ECASD) 410, an ISD-root (ISD-R) 420, an enabled profile 430, a disabled profile 440, and an eUICC operation module 450. The ECASD 410 may be an SD area determined inside the identification module 241 during an operation of producing the identification module 241. The ECASD 410 may include a unique private key of the identification module 241, which cannot be modified, a related certificate, a root public key of the CI, and a keyset of EUM (SIM manufacturer). For example, the ECASD 410 may separately store wireless communication information to be secured in the identification module 241. The ISD-R 420 may provide a secure OTA channel and always maintain an active state. When the electronic device 201 downloads the profile from the outside, the ISD-R 420 may manage the profile and store the profile in the identification module 241 or the memory 230.

The enabled profile 430 and the disabled profile 440 may be spaces in which the profile downloaded from a particular communication service provider can be stored. The enabled profile 430 refers to a profile currently in an active state and the disabled profile 440 refers to a profile currently in a disabled state. FIG. 4 illustrates two profiles including the enabled profile 430 and the disabled profile 440, but is not limited thereto. The enabled profile 430 may include a mobile network operator secure domain (MNO-SD) 431 and an ISD-Profile (ISD-P) 433. The MNO-SD 431 may include MNO OTA keys and provide a secure OTA channel. For example, when a profile A is downloaded from a communication service provider A and is enabled, the identification module 241 may store wireless communication-related information corresponding to the communication service provider A in the MNO-SD. The ISD-P 433 is a separate independent entity in the identification module 241 and may include a file system, a network access application (NAA), and a policy rule. Further, the ISD-P 433 may include information related to generating, enabling, and disabling the profile. In addition, the ISD-P 433 may include a key required for managing the downloaded profile. Like the enabled profile 430, the disabled profile 440 may include an MNO-SD 441 and an ISD-P 443. The disabled profile 440 is a profile currently in a disabled state, and may be enabled under a control of the profile management module 270 of the processor 220. FIG. 4 illustrates one enabled profile 430 but is not limited thereto, and the number of enabled profiles 430 may be one or more. The eUICC operation module 450 may control the operation of the identification module 241 in association with the above described function. For example, the eUICC operation module 450 may use particular information stored in the identification module 241.

A general process of receiving a wireless communication network service through the identification module 241 is identical to the content described below. For example, a manufacturer of the identification module 241 may manufacture the identification module 241 and supply the manufactured identification module 241 to an electronic device manufacturer. The electronic device manufacturer may embed the received identification module 241 into the electronic device 201 and supply the electronic device 201 to the user. The user having received the electronic device 201 may apply to subscribe to a network manager (e.g., a communication service provider) through the electronic device 201. The network manager having received the subscription application may transfer USIM information, such as an IMSI and a K value to the SM-DP 263. The IMSI may refer to a subscriber identification number and may be configured by a combination of a mobile country code (MCC), a mobile network code (MNC), and a phone number. The MCC refers to a country code and the MNC refers to a network provider code. The USIM refers to universal subscriber identification module. The universal subscriber identification module is a card type module available in the electronic device, and may include information on a user having applied the subscription, that is, personal information on the subscriber, which may receive various services, such as an authentication, a charging system, a security function, and the like. The SM-DP 263 may package the received information (e.g., USIM information, such as the IMSI and the K value) in a profile form, encrypt the profile, and transfer the profile to the SM-SR 261. The SM-SR 261 may transmit the profile received from the SM-DP 263 to the electronic device 201 through an over the air (OTA) scheme. The processor 220 of the electronic device 201 may execute an application through which the wireless communication network service can be provided based on the received profile.

Figure 5:
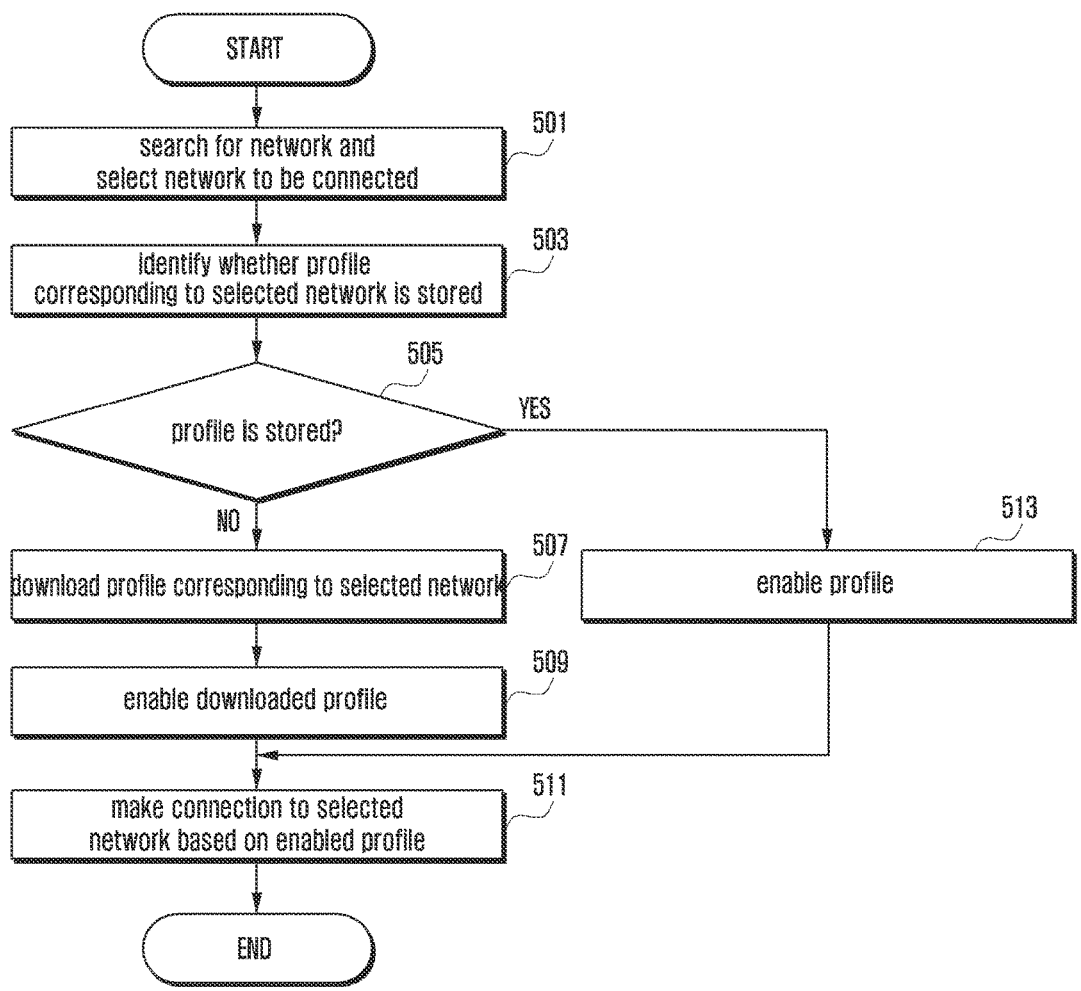
FIG. 5 is a flowchart illustrating a method of making a connection to a selected network through an identification module according to various embodiments of the present disclosure.

FIG. 5 is a flowchart illustrating a method of making a connection to a selected network through an identification module according to various embodiments of the present disclosure.

Referring to FIG. 5, in operation 501, the processor 220 of the electronic device 201 may search for a network and select a network to be connected. The network may be a network, which can be used by the electronic device 201, and may be found based on a communication state. More specifically, the network may be a network to which the electronic device 201 can be connected based on authentication information.

In operation 503, the processor 220 may identify whether a profile corresponding to the selected network is stored. For example, the electronic device 201 may store various pieces of data and the data may include a profile. For example, the processor 220 of the electronic device 201 may identify whether the profile corresponding to the selected network is included in the stored data. When the profile corresponding to the selected network is not stored in operation 505, the processor 220 may download the profile corresponding to the selected network in operation 507. For example, a download path may use a network corresponding to the communication service provider to which the electronic device 201 has subscribed or the selected network.

In operation 509, the processor 220 may enable the downloaded profile.

In operation 511, the processor 220 may be connected to the selected network based on the enabled profile. When the profile corresponding to the selected network is stored in operation 505, the processor 220 may enable the stored profile in operation 513. In operation 511, the processor 220 may be connected to the selected network based on the enabled profile.

Figure 6A:
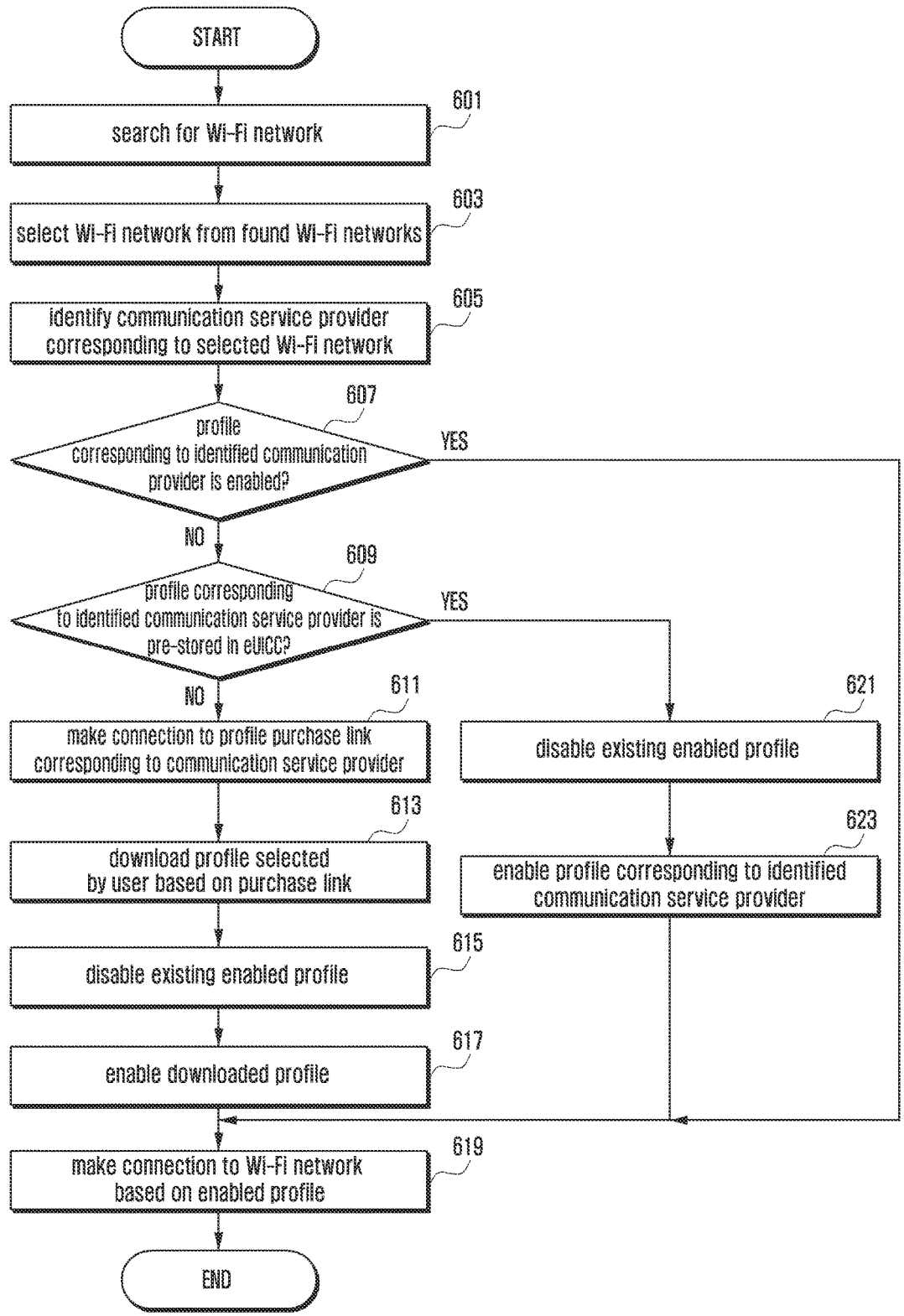
FIGS. 6A and 6B are flowcharts illustrating a method of changing a profile by using an eUICC, which is one of identification modules, according to an embodiment of the present disclosure.
Figure 6B:
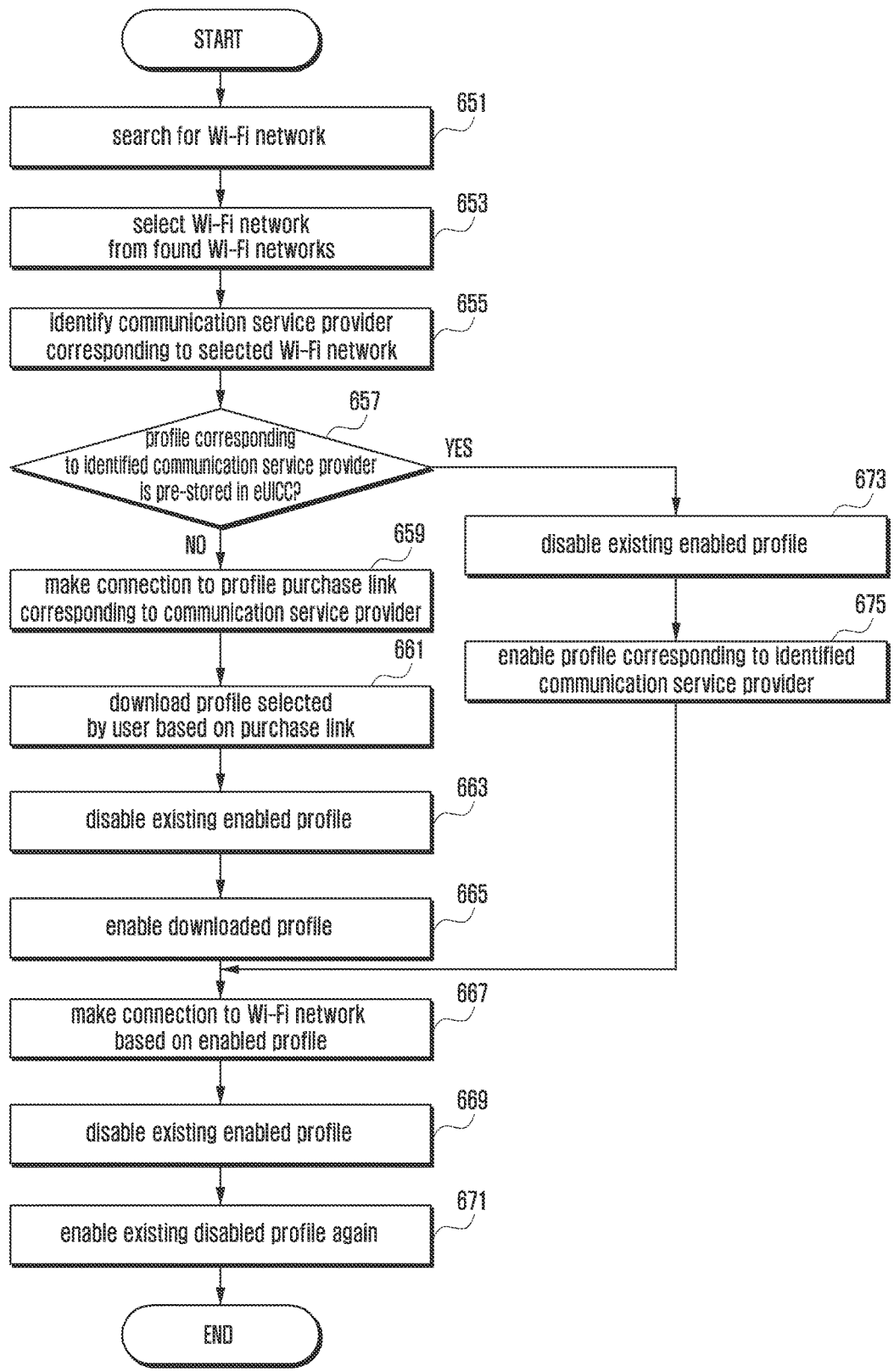

FIGS. 6A and 6B are flowcharts illustrating a method of changing a profile by using an eUICC, which is one of identification modules, according to an embodiment of the present disclosure.

FIG. 6A illustrates a Wi-Fi network instead of a limited network and the eUICC instead of the identification module 241. The limited network may be a Wi-Fi network or an eMBMS network provided by a particular communication service provider. The limited network may be a network which can be connected through an authentication process based on a profile requested by the particular communication service provider.

Referring to FIG. 6A, in operation 601, the processor 220 of the electronic device 201 may search for a Wi-Fi network. For example, the processor 220 may search for a Wi-Fi network which can be used in a current location and a current state. For example, the Wi-Fi network may be the limited network, and correspond to a network through which a particular communication service provider provides a wireless communication network service to a subscriber.

In operation 603, the processor 220 may identify that one or more Wi-Fi networks are selected by the user from the found Wi-Fi networks.

In operation 605, the processor 220 may identify communication service providers corresponding to the selected Wi-Fi networks. Each of the Wi-Fi networks may be formed in accordance with each of the communication service providers.

In operation 607, the processor 220 may determine whether the profile corresponding to the identified communication service provider is in the enabled state. Whether the profile is in the enabled state or the disabled state may be identified through the eUICC embedded in the electronic device 201. The eUICC may store one or more profiles and enable or disable the profiles under a control of the processor 220. When the profile corresponding to the identified communication service provider is not in the enabled state in operation 607, the processor 220 may determine whether the profile corresponding to the identified communication service provider is pre-stored in the eUICC in operation 609. For example, the processor 220 may determine whether the profile corresponding to the communication service provider is pre-stored in the eUICC in the disabled state. When the profile corresponding to the communication service provider is not pre-stored in the eUICC in operation 609, the processor 220 may be connected to a profile acquisition link corresponding to the communication service provider in operation 611. The processor 220 may control the display 250 to display the profile acquisition link. The connection to the profile acquisition link may be made using the network corresponding to the existing profile in the enabled state or using the above described Wi-Fi network.

In operation 613, the processor 220 may download the selected profile by the user based on a purchase link displayed on the display 250. At this time, the connected purchase link and the downloaded profile may be provided through a particular communication service provider server.

In operation 615, the processor 220 may disable the existing profile currently enabled. When the processor 220 simultaneously uses two enabled profiles, operation 615 may be omitted.

In operation 617, the processor 220 may enable the downloaded profile. In operation 619, the processor 220 may be connected to the Wi-Fi network based on the enabled profile. When the profile corresponding to the identified communication service provider is in the enabled state in operation 607, the processor 220 may be connected to the Wi-Fi network based on the enabled profile in operation 619. When the profile corresponding to the identified communication service provider is pre-stored in the eUICC, the processor 220 may disable the existing enabled profile in operation 621. The processor 220 may enable the process corresponding to the identified communication service provider in operation 623 and may be connected to the Wi-Fi network based on the enabled profile in operation 619. The connection to the Wi-Fi network described in the limited network may be applied between a plurality of service providers in one country, or may be applied between a plurality of service providers in several countries. The limited network can provide various types of network services operated by the service provider as well as Wi-Fi. For example, the various types of network services may include a service based on a femtocell operated by the service provider.

Referring to FIG. 6B, operations 651 to 655 are identical to operations 601 to 605 of FIG. 6A. Since a description of operations 651 to 655 is identical to the detailed description of FIG. 6A, it will be omitted.

In operation 657, the processor 220 may determine whether the profile corresponding to the identified communication service provider is pre-stored in the eUICC. When the profile corresponding to the communication service provider is not pre-stored in the eUICC in operation 657, the processor 220 may be connected to a profile acquisition link corresponding to the communication service provider in operation 659. The connection of the profile acquisition link may be made using a network corresponding to the existing profile in the enabled state or using the above described Wi-Fi network like in operation 611 of FIG. 6A.

In operation 661, the processor 220 may download the selected profile by the user based on the profile acquisition link.

In operation 663, the processor 220 may disable the existing enabled profile.

In operation 665, the processor 220 may enable the downloaded profile.

In operation 667, the processor 220 may be connected to the Wi-Fi network based on the enabled profile.

In operation 669, the processor 220 may disable the existing enabled profile.

In operation 671, the processor 220 may re-enable the existing disabled profile. For example, the processor 220 may enable the profile corresponding to a particular communication service provider and be connected to the Wi-Fi network. After the connection to the W-Fi network, the processor 220 may enable the existing profile and thus receive a call service provided by the existing communication service provider. When the profile corresponding to the identified communication service provider is pre-stored in the eUICC, the processor 220 may disable the existing enabled profile in operation 673.

In operation 675, the processor 220 may enable the profile corresponding to the identified communication service provider. In operation 667, the processor 220 may be connected to the Wi-Fi network based on the enabled profile.

Figure 7A:
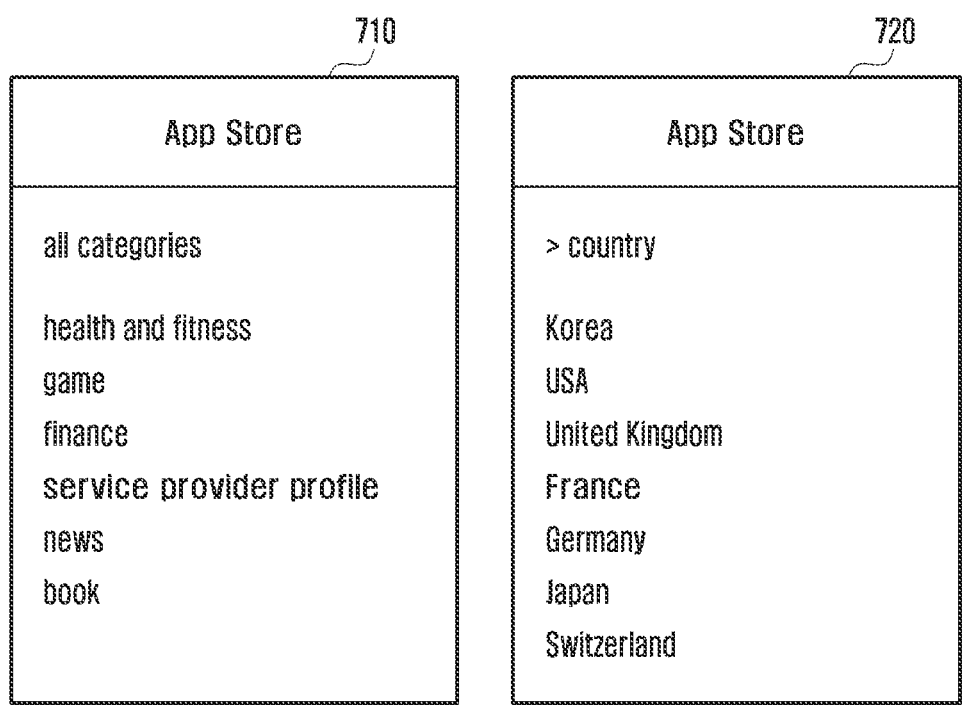
Figure 7C:
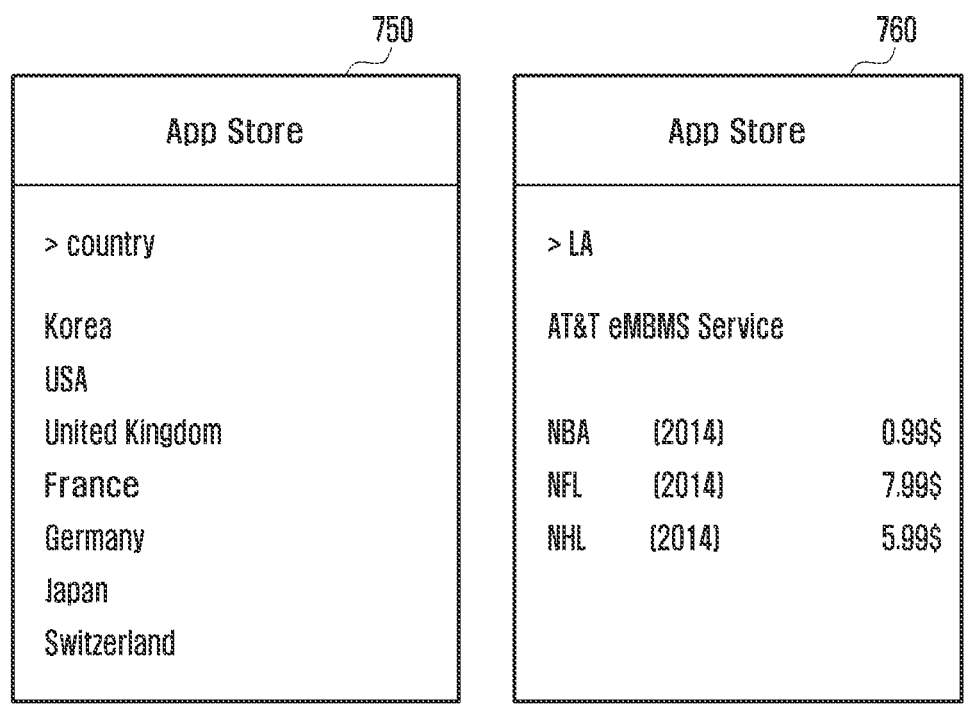

FIGS. 7A, 7B, and 7C illustrate download-related information on a profile displayed on a display unit according to various embodiments of the present disclosure.

Referring to FIGS. 7A, 7B, and 7C, when the user uses the wireless communication network, the processor 220 may set an application or a device related to the profile corresponding to the communication service provider or execute environment settings. The profile-related application may be an application through which the profile can be downloaded based on the user's selection among profiles corresponding to a plurality of communication service providers. For example, the processor 220 may search for a Wi-Fi network and identify one Wi-Fi network selected by the user. The processor 220 may identify whether the profile corresponding to the selected one Wi-Fi network is enabled or the profile corresponding to the selected one Wi-Fi network is stored. When the profile corresponding to the selected one Wi-Fi network is enabled, the processor 220 may receive the wireless communication network service by using the enabled profile. When the profile corresponding to the selected one Wi-Fi network is pre-stored in the electronic device 201 in the disabled state, the processor 220 may receive the wireless communication network service by using enabling the profile.

When the profile corresponding to the selected one Wi-Fi network is not stored in the electronic device 201, the processor 220 may display screens on the display 250 through which a particular profile can be downloaded as illustrated in FIGS. 7A, 7B and 7C. The processor 220 may display a plurality of menus on a screen 710. The plurality of menus may include menus through which a profile "service provider profile" can be downloaded. The processor 220 may display a country list in which the user desires to receive the wireless communication network service on a screen 720. The processor 220 may display the country list based on roaming. The processor 220 may display a wireless communication network service list which can be provided in USA on a screen 730 of FIG. 7B. The processor 220 may separately display particular communication service provider information (e.g., AT&T and Verizon) and wireless communication networks (e.g., Wi-Fi, 3rd generation (3G)/ long term evolution (LTE), and evolved multimedia broadcast and multicast service (eMBMS) on the screen 730. When the user selects "AT&T Wi-Fi", the processor 220 may display a plurality of payment plans corresponding to wireless communication network service use periods and wireless communication network service use capacities on a screen 740. When the user selects "eMBMS", the processor 220 may display contents, which can be provided, and use fees on screens 750 and 760 of FIG. 7C. The evolved eMBMS is a broadcasting system in which a communication service provider can simultaneously transfer large capacity contents to a plurality of users through a particular frequency band without any load, which will be described below with reference to FIGS. 10 to 15.

Figure 8:
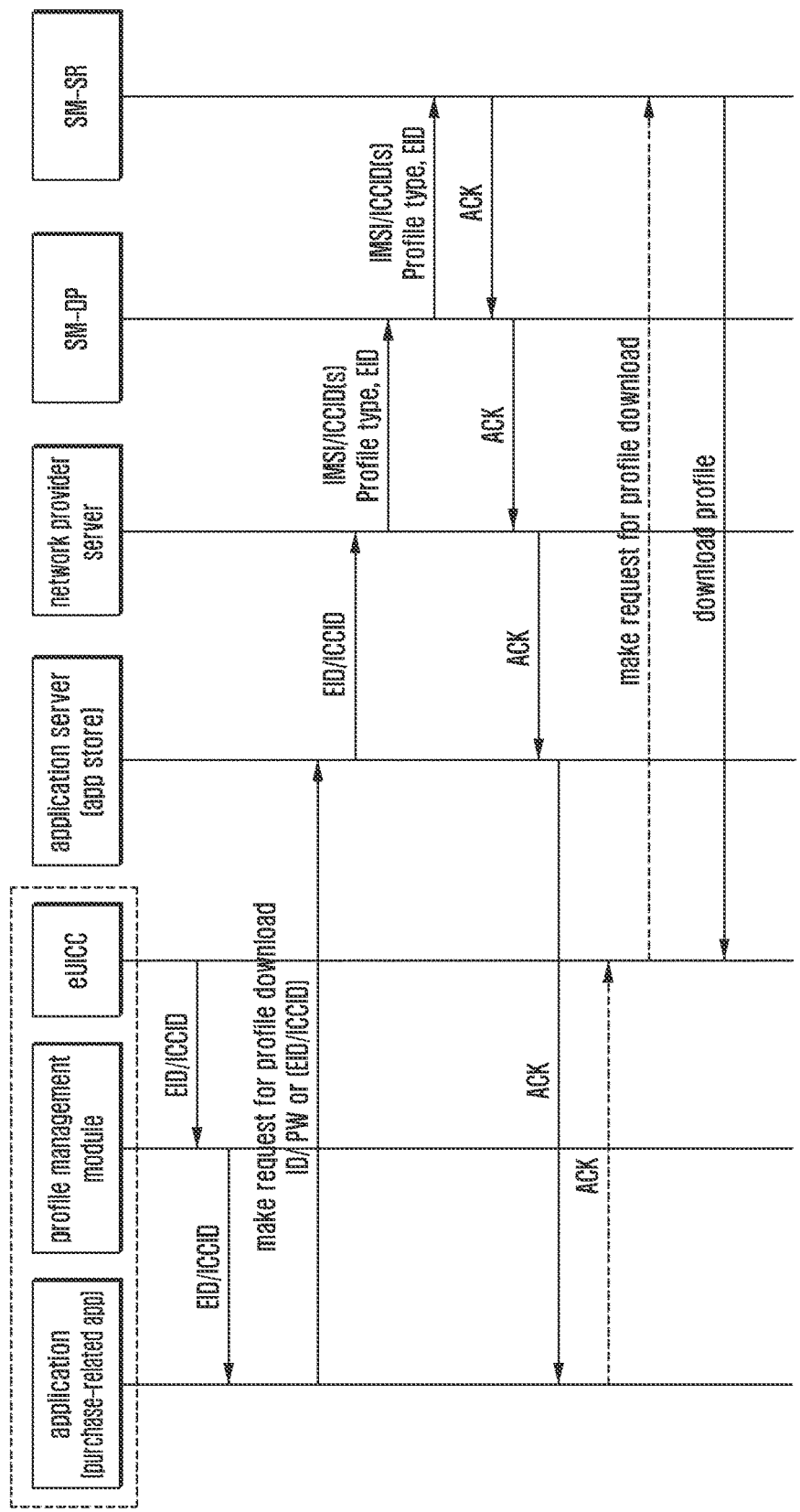
FIG. 8 is a flowchart illustrating a process for downloading a profile according to various embodiments of the present disclosure.

FIG. 8 is a flowchart illustrating a process for downloading a profile according to various embodiments of the present disclosure.

Referring to FIG. 8, the processor 220 of the electronic device 201 may receive a profile selected by the user from the SM-SR 261 through an OTA scheme. For example, an application server, such as an App store may authenticate the user based on a user ID/PASSWORD used in an application for application purchase. The processor 220 of the electronic device 201 may additionally transmit an electronic device ID (EID) or an integrated circuit card ID (ICCID) as well as the user ID/PASSWORD to more accurately perform user authentication. Further, the authentication may be performed using only the EID or the ICCID. ICCID may be a unique ID corresponding to the eUICC embedded in the electronic device 201.

Referring to FIG. 8, the processor 220 may load the EID and the ICCID in the profile management module from the eUICC, and transfer the EID and the ICCID to a profile purchase-related application. Further, the processor 220 may identify the profile selected by the user based on the profile purchase-related application. The processor 220 may transmit the user ID/PASSWORD to the application server (e.g., an App store) to purchase the profile selected by the user. At this time, the processor 220 may also transmit the EID and the ICCID. The application server may instruct the network provider server 265 to download the profile selected by the user based on received authentication information (e.g., the user ID/PASSWORD). The network provider server 265 may transfer a profile type corresponding to the IMSI/ICCID and the EID to the SM-SR 261 via the SR-DP 263. The SM-DP 263 may package the profile selected by the user and transfer the profile to the SM-SR 261. The SM-SR 261 may transmit a response signal corresponding to a profile purchase-related request signal to the electronic device 201. The processor 220 of the electronic device 201 may make a request for downloading the profile to the SM-SR 261 and download the profile from the SM-SR 261. Although not illustrated, the processor 220 may generate a security domain in accordance with the downloaded profile and receive the wireless communication network service by using the profile.

Figure 9A:
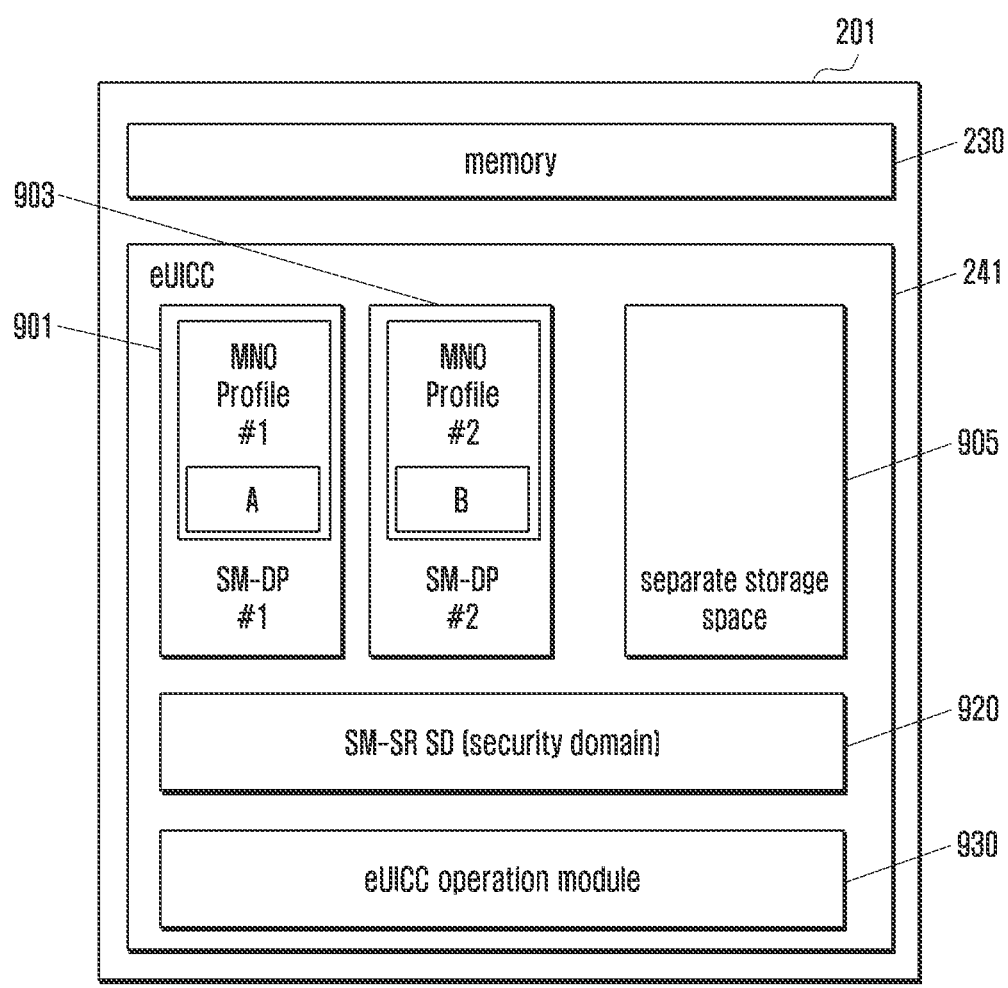
FIGS. 9A and 9B illustrate a method of storing a profile in an eUICC according to various embodiments of the present disclosure.
Figure 9B:
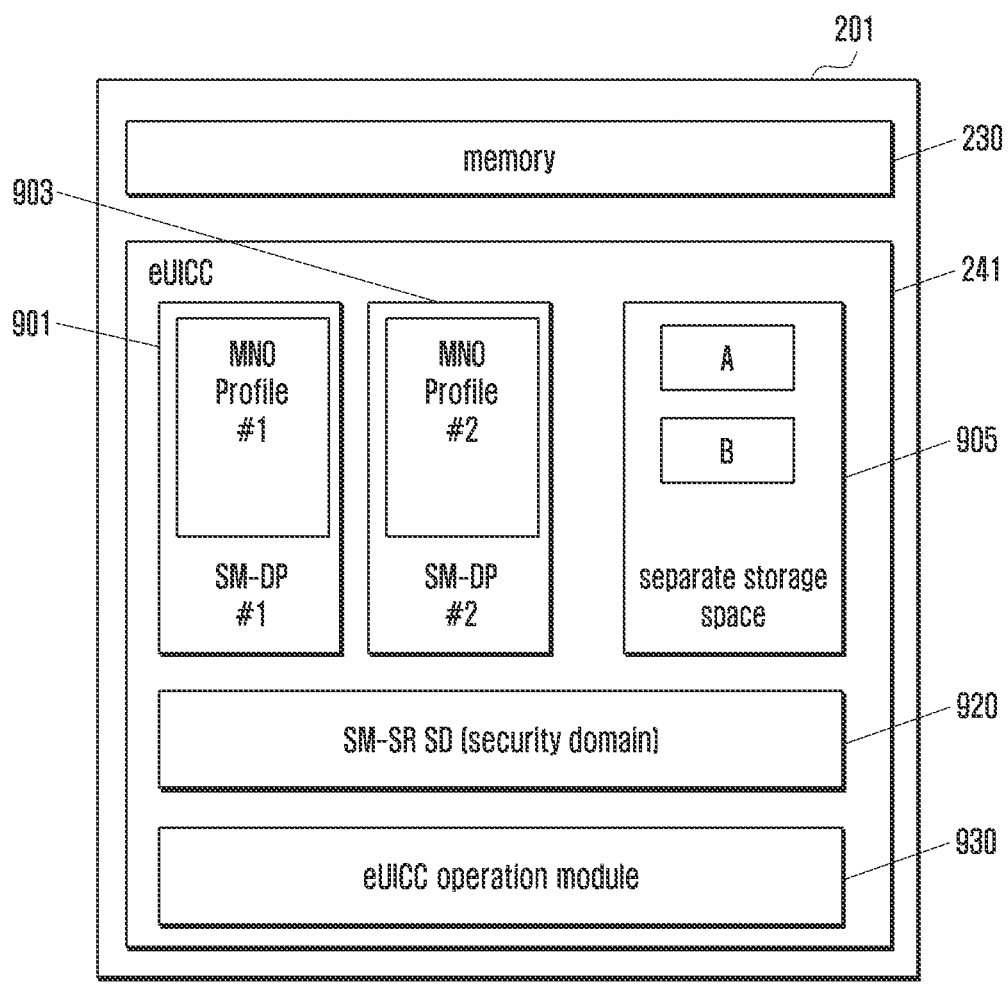

FIGS. 9A and 9B illustrate a method of storing a profile in an eUICC according to various embodiments of the present disclosure.

Referring to FIG. 9A, the electronic device 201 may include the memory 230 and the eUICC (e.g., the identification module 241 of FIG. 2). The eUICC may include a plurality of storage spaces (e.g., 901, 903, and 905) in which a plurality of separate profiles can be stored and installed, a security domain 920 for securing the profile stored in the storage space, and an eUICC operation module 930. The security domain may include particular key values, such as an IMSI, an EID, an ICCID, a mobile station international subscriber directory number (MSISDN), and the like, for authenticating the wireless communication network. For example, the electronic device 201 may download a profile corresponding to a particular communication service provider to receive a wireless communication network service provided by the particular communication service provider. The processor 220 of the electronic device 201 may store the downloaded profile in the eUICC 241 or the memory 230. The processor 220 may secure authentication information, through which the wireless communication network corresponding to the downloaded profile can be used, in the security domain 920. The processor 220 may select and operate enablement and disablement of the stored profile through the eUICC operation module 930. In general, when the profile is downloaded from the outside, the processor 220 may change the enabled state of the existing profile into the disabled state and change the state of the newly downloaded profile into the enabled state. Further, the processor 220 may access the security domain based on the enabled state to call authentication information required for the wireless communication network.

Referring to FIG. 9B, the electronic device 201 may separately manage the downloaded profiles in a particular storage space (e.g., the separate storage space 905) at the same time. For example, the eUICC may separately store profiles corresponding to a plurality of communication service providers in a particular storage space (e.g., the separate storage space 905) according to each provided service, such as Wi-Fi or eMBMS. The separate storage space 905 illustrated in FIGS. 9A and 9B is illustrated as being included in the eUICC, but is not limited thereto. The electronic device 201 may store a plurality of downloaded profiles in a particular storage space within the eUICC 241 or in the memory 230 embedded in the electronic device 201. Although not illustrated, the processor 220 may store the plurality of profiles in an external storage device. The electronic device 201 according to the present disclosure may manage the profile stored in the particular storage space and use the profile through the enablement and the disablement of the profile.

Figure 10:
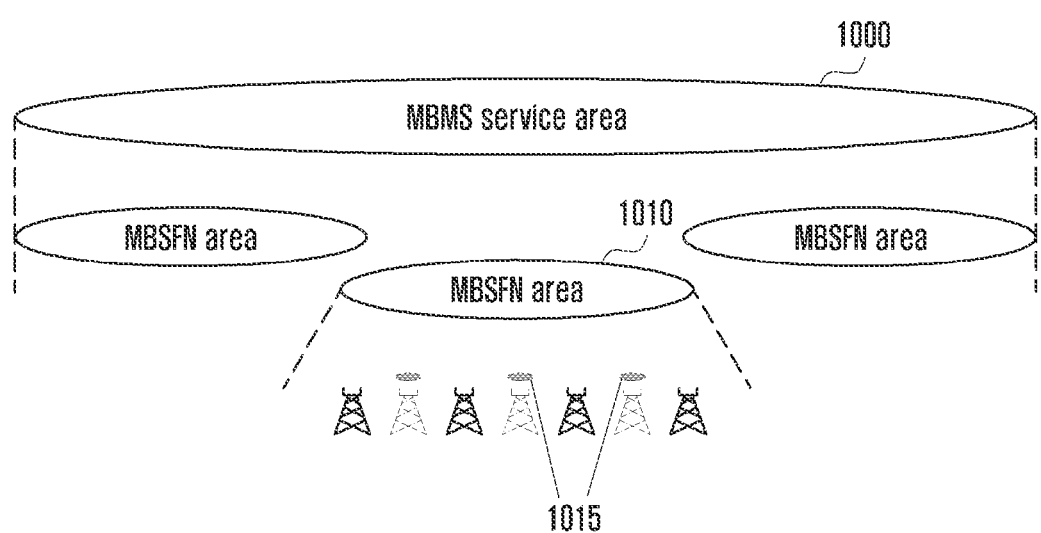
FIG. 10 is a diagram illustrating a communication in which a multimedia broadcast multicast service (MBMS) service is provided to describe the MBMS service according to various embodiments of the present disclosure.

FIG. 10 is a diagram illustrating a communication in which an MBMS is provided to describe the MBMS according to various embodiments of the present disclosure.

Referring to FIG. 10, an MBMS area 1000 is a network area including a plurality of multimedia broadcast multicast service single frequency network (MB SFN) areas 1010 in which MBSFN transmission can be performed. The Multimedia Broadcast and Multicast Service (MBMS) may be a broadcasting service for simultaneously transferring large capacity contents to a plurality of users by using a particular frequency band. For example, the MBMS may aim at subscribers of a particular communication service provider, which can use a particular frequency band, and the user of the electronic device 201 may require a process of subscribing to the particular communication service provider. A streaming video service provided by the existing communication service provider uses a unicast access scheme and has a limitation on the number of simultaneous access users who use a data channel. For example, when a number of users swarm in at the same time zone, the unicast access scheme may have difficulty in performing smooth access. In contrast, the MBMS requires a data channel according to each content, and has no limitation on the number of simultaneous access users. Accordingly, the MBMS may more efficiently manage traffic. The electronic device 201 according to another embodiment of the present disclosure may more efficiently use an eMBMS by using the eUICC embedded in the electronic device 201 when receiving the eMBMS. The aforementioned MBMS area 1000 may include the plurality of MBSFN areas 1010 and the MBSFN area 1010 may be a network area including several cells integrally managed for MBSFN transmission. All the cells in the MBSFN area 1010 may be synchronized in connection with the MBSFN transmission. The MBSFN area 1010 may include MBSFN area reserved cells 1015. The MBSFN area reserved cell 1015 is a cell, which is not used for the MBSFN transmission, and may be a cell which can be used for transmission for another purpose other than the MSMB service.

Figure 11:
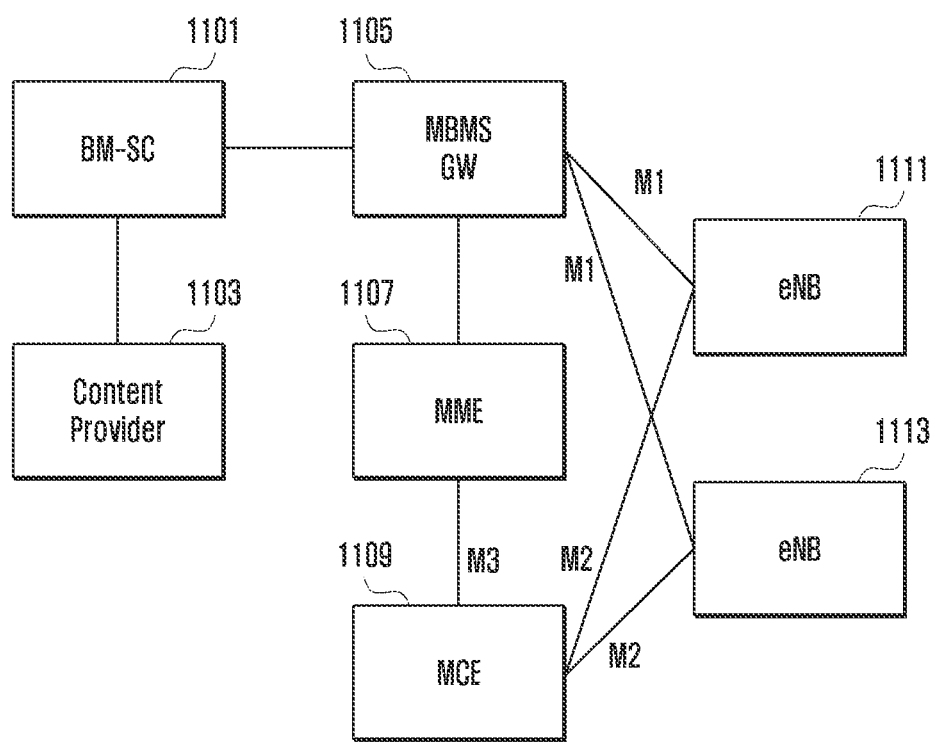
FIG. 11 illustrates an embedded MBMS (eMBMS) network structure according to various embodiments of the present disclosure.

FIG. 11 illustrates an eMBMS network structure according to various embodiments of the present disclosure.

Referring to FIG. 11, a broadcast/multicast service center (BM-SC) 1101 may receive contents from a content provider 1103 and transmit the contents to a particular communication service provider subscriber. More specifically, the BM-SC 1101 may control whether to accept a connection of the electronic device 201 having made the request for enabling the MBMS to the wireless communication network. Further, the BM-SC 1101 may control authentication and charging of the electronic device 201. An MBMS gateway (MBMS GW) 1105 is a logical node and may process a multicast IP packet to the eNB 1111 from the BM-SC 1101. A mobility management entity (MME) 1107 may process a non-access status (NAS)-related message. A multi-cell/multicast coordination entity (MCE) 1109 may coordinate resources and parameters such that the same resources and the same transmission parameters are used in the whole MBSFN areas. A connection between the MBMS GW 1105 and the eNB 1111 may be defined as M1, a connection between the MCE 1109 and the eNB 1113 may be defined as M2, and a connection between the MME 1107 and the MCE 1109 may be defined as M3.

Figure 12A:
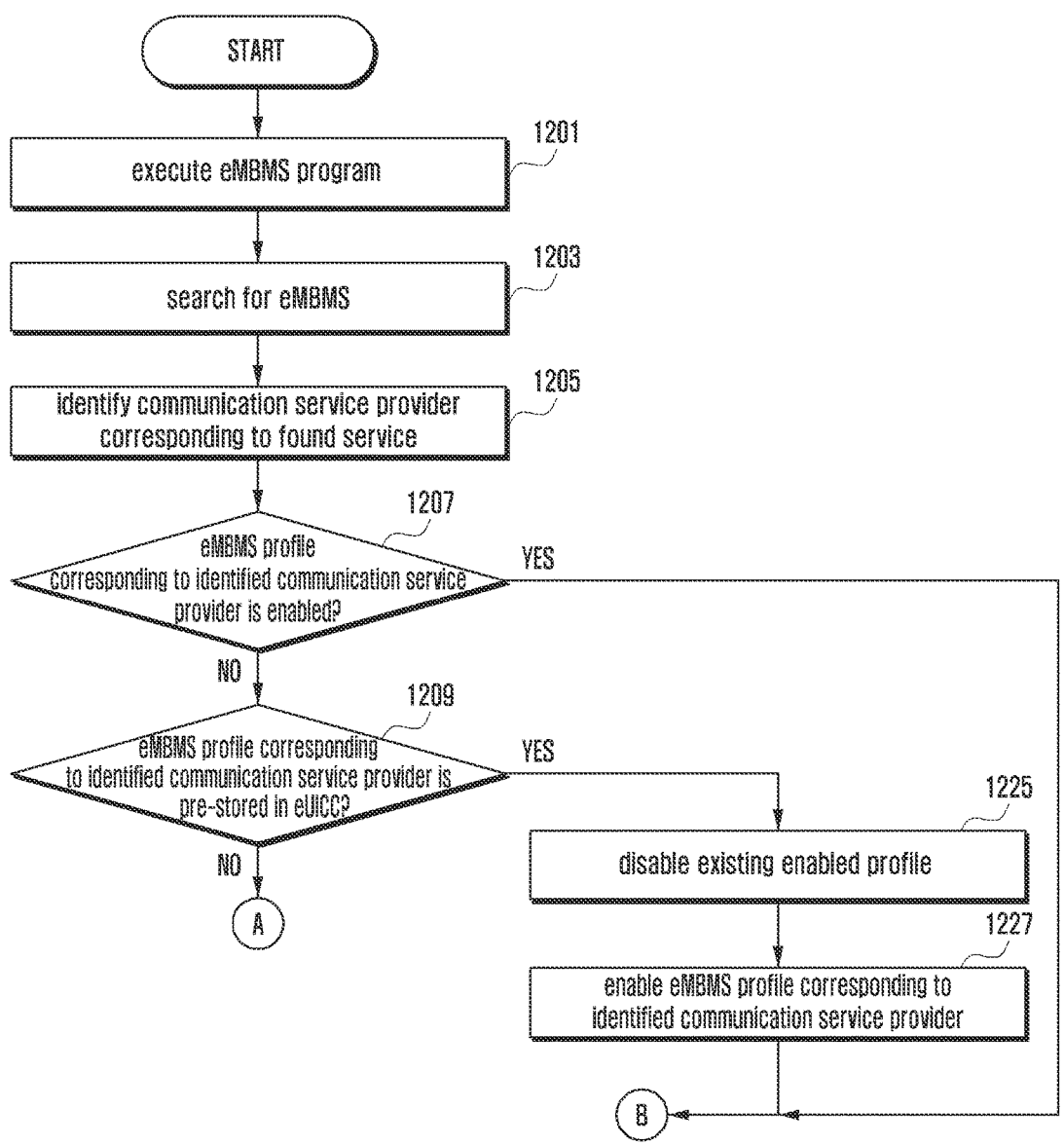
FIGS. 12A and 12B are flowcharts illustrating a method of receiving an eMBMS based on one antenna according to an embodiment of the present disclosure.
Figure 12B:
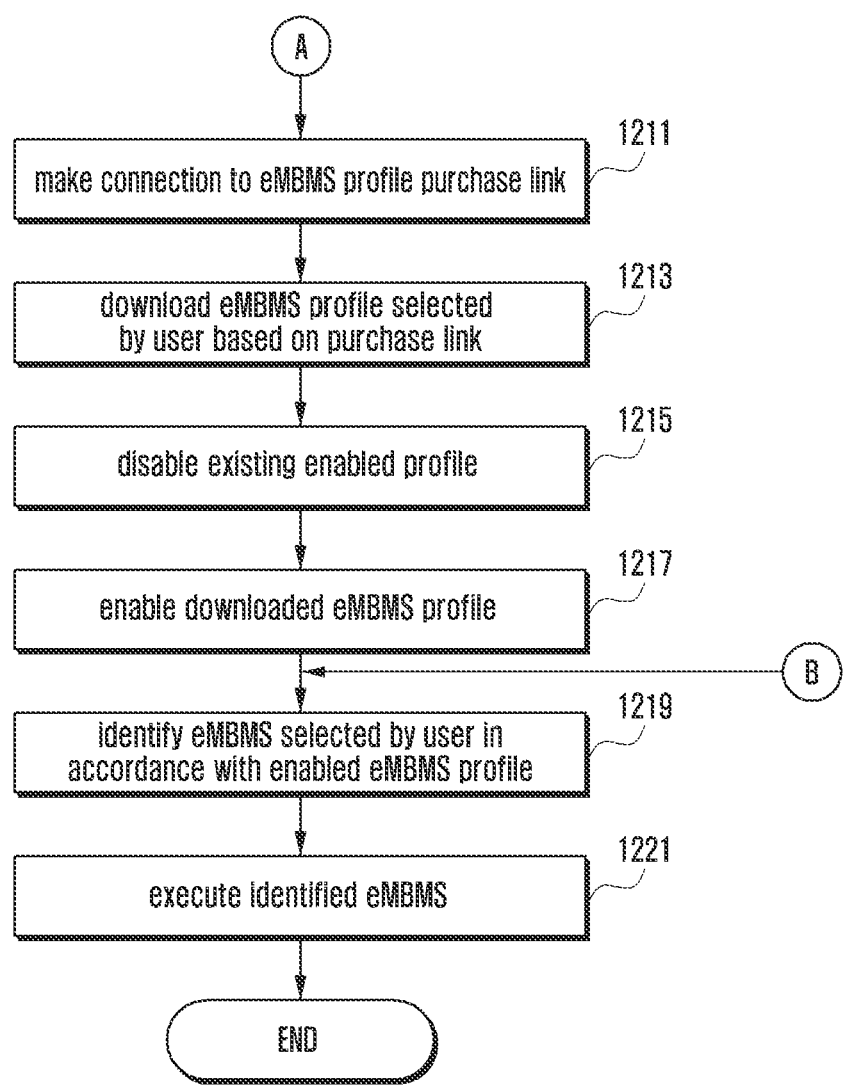

FIGS. 12A and 12B are flowcharts illustrating a method of receiving an eMBMS based on one antenna according to an embodiment of the present disclosure.

Referring to FIGS. 12A and 12B, the eMBMS instead of the limited network is illustrated. Referring to FIGS. 12A and 12B, in operation 1201, the processor 220 may execute an eMBMS program. The eMBMS program may be a program by which the user may receive the eMBMS through the electronic device 201. The eMBMS may be a particular application.

In operation 1203, the processor 220 may search for the eMBMS. For example, a communication service provider may provide the eMBMS in a particular region (e.g., a baseball stadium or a basketball court). The processor 220 of the electronic device 201 may search for the provided eMBMS.

In operation 1205, the processor 220 may identify a communication service provider corresponding to the found service. Although not illustrated, the processor 220 may detect the user's selection based on the found eMBMS and identify the communication service provider of the eMBMS corresponding to the detected user's selection.

In operation 1207, the processor 220 may determine whether the eMBMS profile corresponding to the identified communication service provider is enabled. For example, the processor 220 may determine whether the eMBMS profile corresponding to the identified communication service provider is currently in the enabled state.

When the eMBMS profile corresponding to the identified communication service provider is not in the enabled state in operation 1207, the processor 220 may determine whether the eMBMS profile corresponding to the identified communication service provider is pre-stored in the eUICC in operation 1209. When the eMBMS profile is not pre-stored in the eUICC in operation 1209, the processor 220 may be connected to an eMBMS profile acquisition link in operation 1211. The connection to the eMBMS profile acquisition link may be made using the network corresponding to the existing profile in the enabled state or using the network of the communication service provider providing the eMBMS.

In operation 1213, the processor 220 may download the eMBMS profile selected by the user based on a purchase link.

In operation 1215, the processor 220 may disable the existing enabled profile.

In operation 1217, the processor 220 may enable the downloaded eMBMS profile.

In operation 1219, the processor 220 may identify the eMBMS selected by the user in accordance with the enabled eMBMS profile.

In operation 1221, the processor 220 may execute the identified eMBMS. For example, the processor 220 may provide one service among the eMBMSs. For example, at the baseball stadium, the user may select the eMBMS by using the electronic device 201 and receive the eMBMS. The eMBMS may be a particular broadcasting service provided only near the baseball stadium in accordance with a baseball game. Although not illustrated, the processor 220 may disable the enabled eMBMS profile. Further, the processor 220 may re-enable the existing disabled profile. For example, the processor 220 may receive the existing communication service originally provided, based on the existing re-enabled profile. For example, based on the downloaded eMBMS profile, the processor 220 may authenticate the electronic device 201 for the communication service provider corresponding to the eMBMS profile. After the authentication, the processor 220 may receive the eMBMS from the communication service provider corresponding to the eMBMS profile. The processor 220 may receive the originally provided communication service again by re-enabling the existing profile. For example, the processor 220 may enable the downloaded eMBMS for a while to receive the eMBMS. When the eMBMS profile corresponding to the identified communication service provider is pre-stored in the eUICC in operation 1209, the processor 220 may disable the existing enabled profile in operation 1225 and enable the eMBMS profile corresponding to the identified communication service provider in operation 1227. The processor may identify the eMBMS selected by the user in accordance with the enabled eMBMS profile in operation 1219 and execute the identified eMBMS in operation 1221. The electronic device 201 corresponding to the description of FIGS. 12A and 12B has one antenna embedded therein and uses the eMBMS through a time division multiplexing scheme using the antenna.

Figure 13:
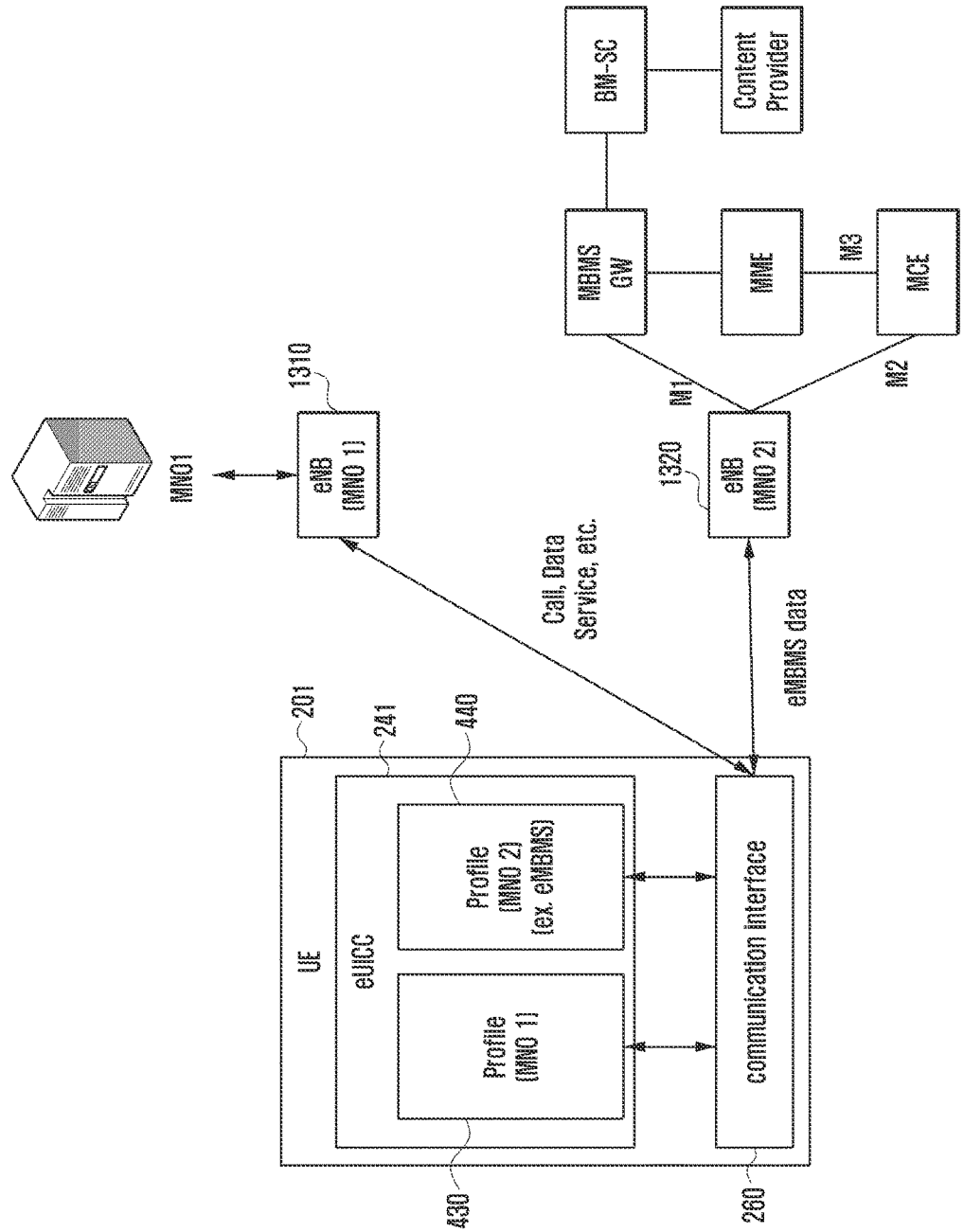
FIG. 13 illustrates a method of providing an eMBMS based on one antenna according to an embodiment of the present disclosure.

FIG. 13 illustrates a method of providing an eMBMS based on one antenna according to an embodiment of the present disclosure.

Referring to FIG. 13, the electronic device 201 may include the identification module 241. The identification module 241 may include one or more profiles (e.g., the MNO 1 profile 430 and the MNO 2 profile 440). The profile may be a profile corresponding to a particular communication service provider to receive a wireless communication network service from the particular communication service provider. More specifically, the MNO 1 profile 430 may be a profile that may receive the general wireless communication service and the MNO 2 profile 440 may be profile that may receive the eMBMS. The processor 220 of the electronic device 201 may control enablement and disablement of the profile included in the identification module 241. The processor 220 may enable several profiles, and both the MNO 1 profile 430 and the MNO 2 profile 440 may be in the enabled state. The processor 220 may receive the wireless communication network service from the outside based on the enabled profile. For example, the processor 220 may receive the wireless communication network service from an MNO 1 communication service provider via a first eNB (MNO 1) 1310 based on the MNO 1 profile 430. More specifically, the processor 220 may receive a call service and an Internet service from the MNO 1 communication service provider. Further, the processor 220 may receive the eMBMS from an MNO 2 communication service provider via a second eNB (MNO 2) 1320 based on the MNO 2 profile 440. A process of receiving the eMBMS through the second eNB (MNO 2) 1320 may be a process identical to the process described in FIG. 11.

Figure 14A:
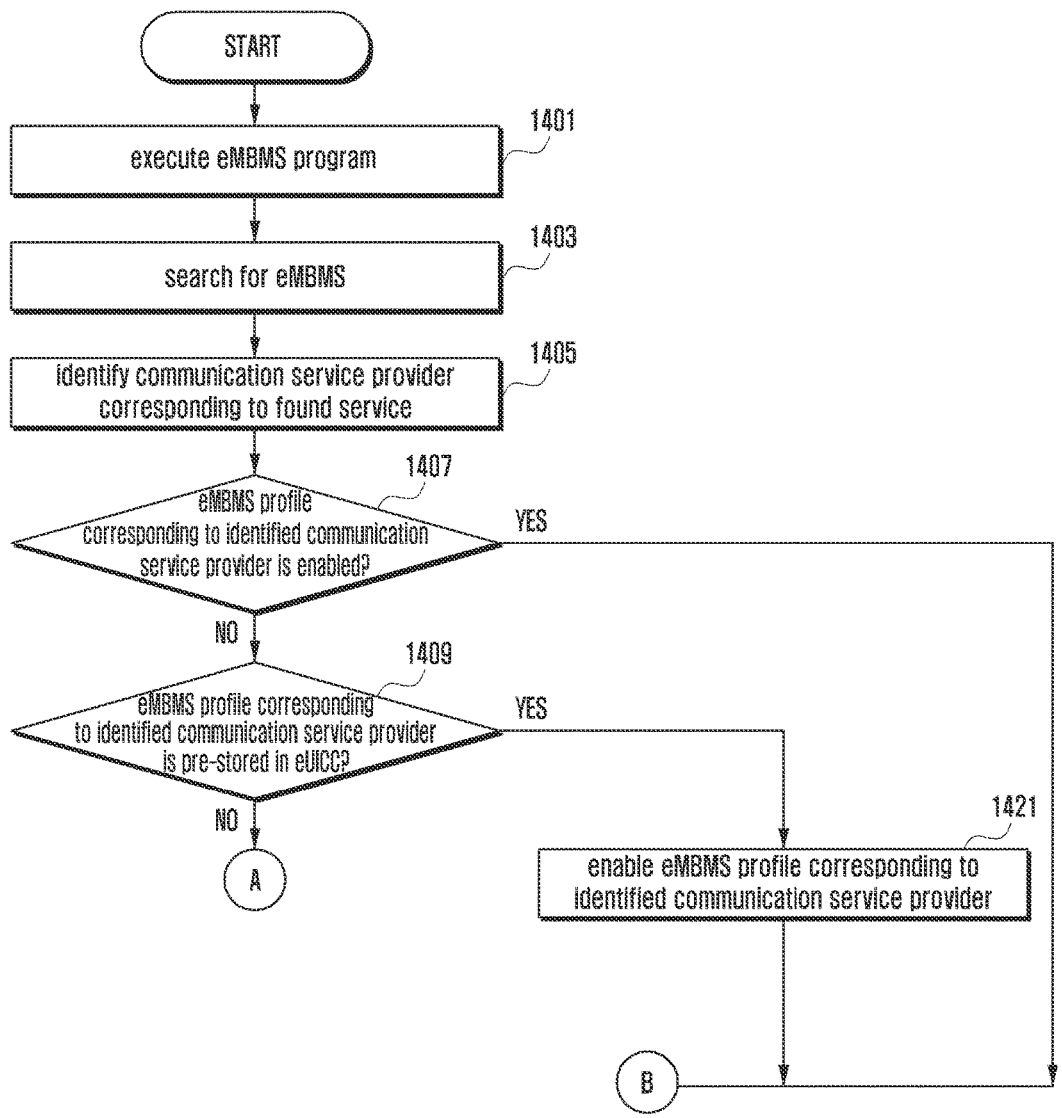
FIGS. 14A and 14B are flowcharts illustrating a method of receiving an eMBMS based on two or more antennas according to an embodiment of the present disclosure.
Figure 14B:
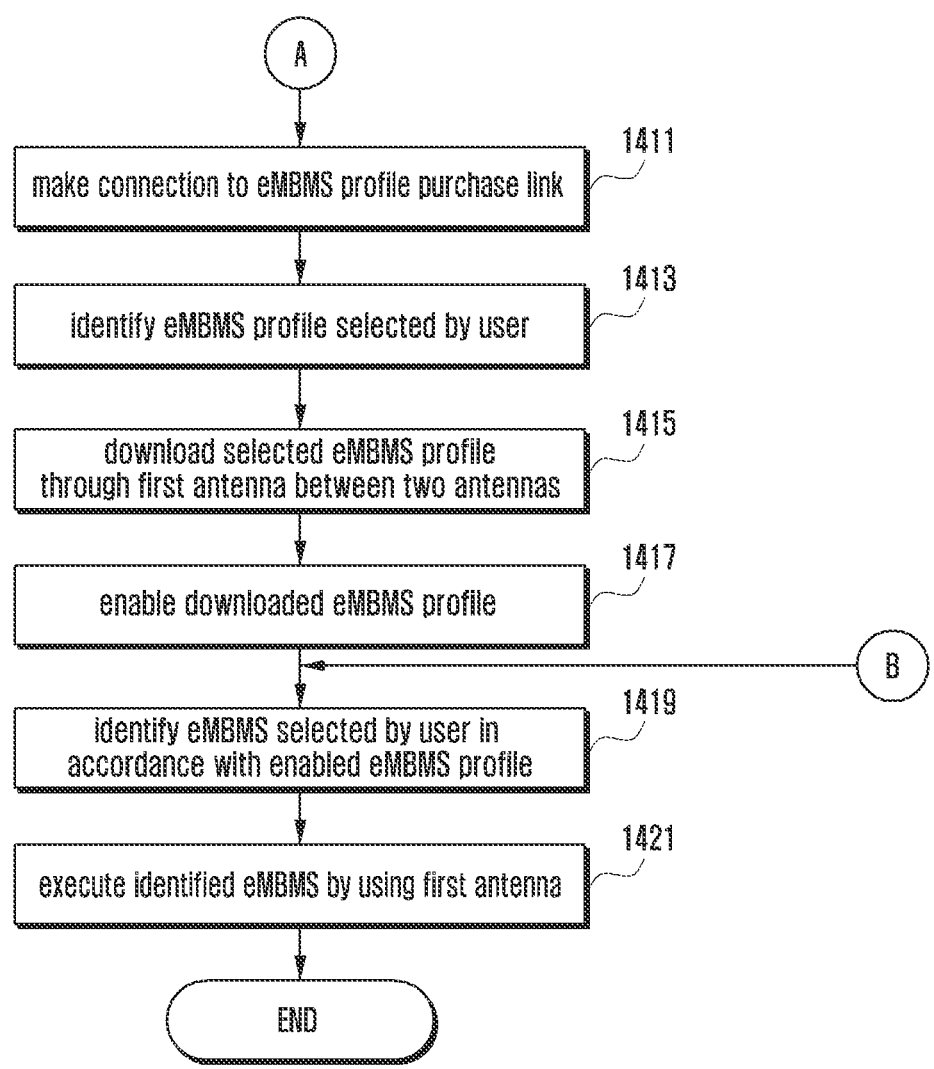

FIGS. 14A and 14B are flowcharts illustrating a method of receiving an eMBMS based on two or more antennas according to an embodiment of the present disclosure.

Referring to FIGS. 14A and 14B, in operation 1401, the processor 220 may execute an eMBMS program. The eMBMS program may be a program by which the user may receive the eMBMS through the electronic device 201. The eMBMS may be a particular application.

In operation 1403, the processor 220 may search for the eMBMS.

In operation 1405, the processor 220 may identify a communication service provider corresponding to the found service. Although not illustrated, the processor 220 may detect the user's selection based on the found eMBMS and identify the communication service provider of the eMBMS corresponding to the detected user's selection.

In operation 1407, the processor 220 may determine whether the eMBMS profile corresponding to the identified communication service provider is enabled. For example, the processor 220 may determine whether the eMBMS profile corresponding to the identified communication service provider is currently in the enabled state. When the eMBMS profile corresponding to the identified communication service provider is not in the enabled state in operation 1407, the processor 220 may determine whether the eMBMS profile corresponding to the identified communication service provider is pre-stored in the eUICC in operation 1409.

When the eMBMS profile is not pre-stored in the eUICC in operation 1409, the processor 220 may be connected to an eMBMS profile acquisition link in operation 1411 of FIG. 14. The eMBMS profile acquisition link may be an Internet site that can be connected even when the electronic device 201 cannot receive the wireless communication network service. The user may select the eMBMS profile which the user desires to purchase from the connected eMBMS profile acquisition link.

In operation 1413, the processor 220 may identify the eMBMS profile selected by the user.

In operation 1415, the processor 220 may download the selected eMBMS profile through a first antenna among two antennas embedded in the electronic device 201.

In operation 1417, the processor 220 may enable the downloaded eMBMS profile.

In operation 1419, the processor 220 may identify the eMBMS selected by the user in accordance with the enabled eMBMS profile.

In operation 1421, the processor 220 may execute the identified eMBMS by using the first antenna. When the eMBMS profile corresponding to the identified communication service provider is in the enabled state in operation 1407, the processor 220 may identify the eMBMS selected by the user in accordance with the enabled eMBMS profile in operation 1419 and execute the identified eMBMS by using the first antenna in operation 1421.

Further, when the eMBMS profile corresponding to the identified communication service provider is pre-stored in the eUICC in operation 1409, the processor 220 may enable the eMBMS profile corresponding to the identified communication service provider in operation 1423. The processor 220 may identify the eMBMS selected by the user in accordance with the enabled eMBMS profile in operation 1419 and execute the identified eMBMS by using the first antenna in operation 1421. For example, in operations 1419 and 1421, the processor 220 may execute the eMBMS by using the first antenna and perform the communication network service provided by the existing communication service provider to which the electronic device 201 has subscribed, by using the other embedded antenna. In other words, the electronic device 201 corresponding to the description of FIGS. 14A and 14B has at least two antennas therein. One of the two antennas may provide the wireless communication network service based on the existing enabled profile and the other antenna may provide the wireless communication network service based on the downloaded profile. For example, the electronic device 201 may use the wireless communication network services corresponding to a plurality of communication service providers by using two antennas.

Figure 15:
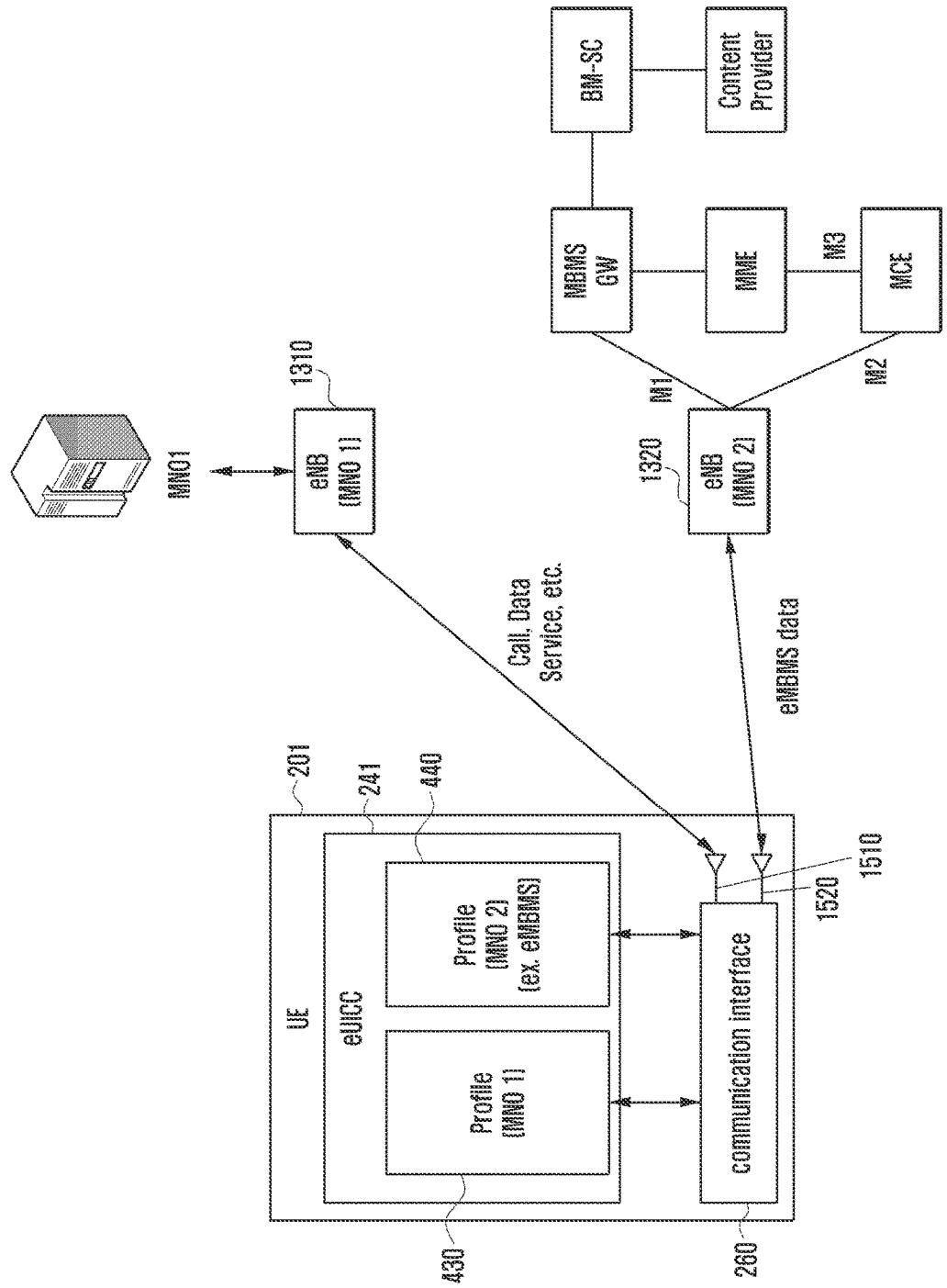
FIG. 15 illustrates a method of receiving an eMBMS based on two antennas according to an embodiment of the present disclosure.

FIG. 15 illustrates a method of receiving an eMBMS based on two antennas according to an embodiment of the present disclosure.

Referring to FIG. 15, the electronic device 201 may include the identification module 241. The identification module 241 may include one or more profiles (e.g., the MNO 1 profile 430 and the MNO 2 profile 440). The profile may be a profile corresponding to a particular communication service provider to receive a wireless communication network service from the particular communication service provider. More specifically, the MNO 1 profile 430 may be a profile that may receive a general wireless communication service and the MNO 2 profile 440 may be profile that may receive the eMBMS. The processor 220 of the electronic device 201 may control enablement and disablement of the profile included in the identification module 241. The processor 220 may enable several profiles, and both the MNO 1 profile 430 and the MNO 2 profile may be in the enabled state. The processor 220 may receive the wireless communication network service from the outside through the wireless communication unit based on the enabled profile. The communication interface 260 may include two antennas (e.g., a first antenna 1510 and a second antenna 1520), and the antennas may receive a particular signal from the outside at the same time. For example, the processor 220 may receive a call service and an Internet service from the MNO 1 communication service provider based on the MNO 1 profile 430. At this time, the processor 220 may receive the wireless communication network service from the MNO 1 communication service provider via the first eNB (MNO 1) 1310 by using the first antenna 1510 among the two embedded antennas. Further, the processor 220 may receive the eMBMS from the MNO 2 communication service provider based on the MNO 2 profile 440. At this time, the processor 220 may receive the eMBMS from the MNO 2 communication service provider via the second eNB (MNO 2) 1320 by using the second antenna 1520 among the two embedded antennas. A process of receiving the eMBMS through the second eNB (MNO 2) 1320 illustrated in FIG. 15 may be a process identical to the process described in FIG. 11.

Figure 16:
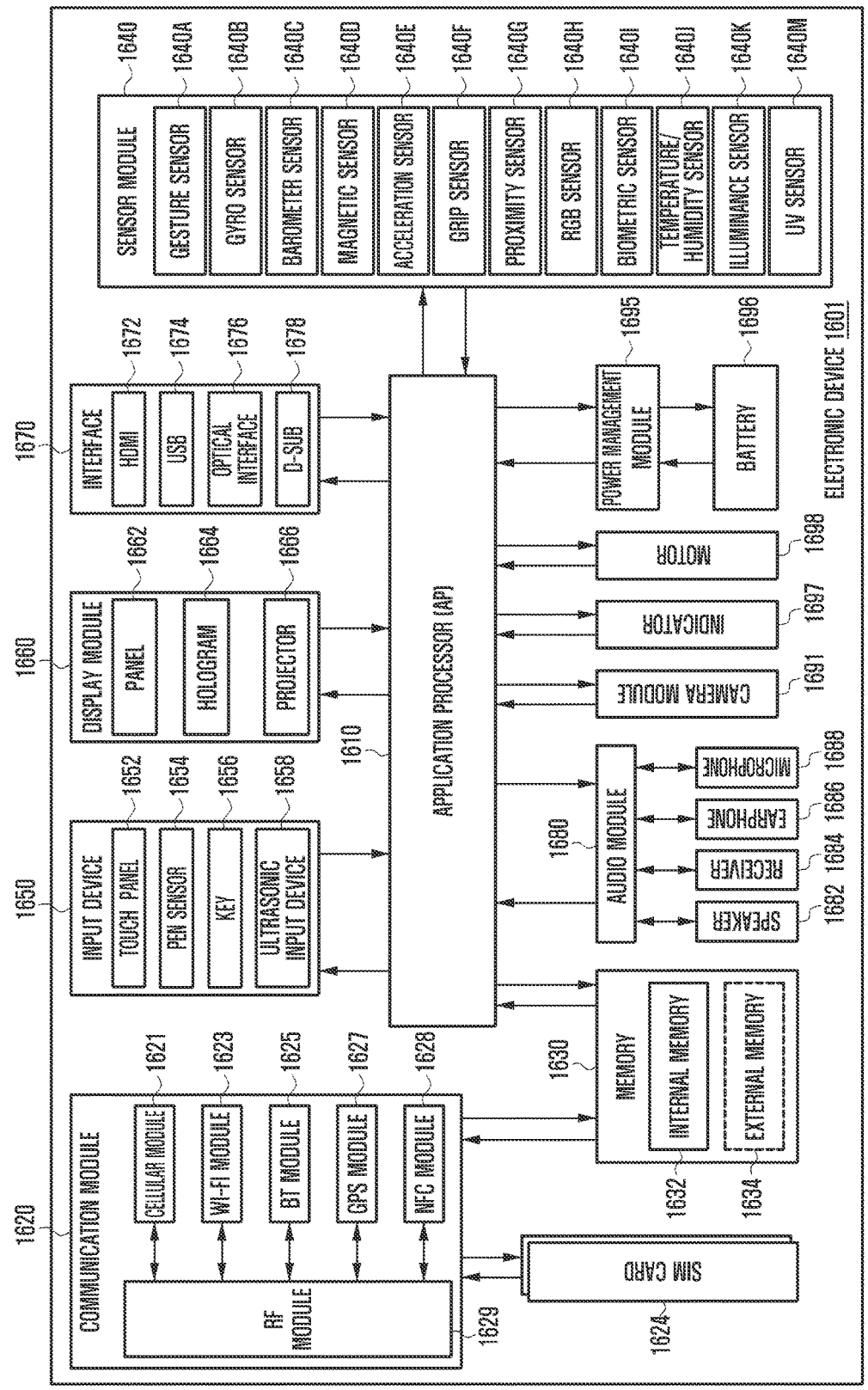
FIG. 16 is a block diagram illustrating an electronic device according to various embodiments of the present disclosure.

FIG. 16 is a block diagram illustrating a configuration of an electronic device according to various embodiments of the present disclosure.

Referring to FIG. 16, an electronic device 1601 may be of the whole or a part of the electronic device 201. The electronic device 1601 may include an AP 1610, a communication module 1620, a SIM card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may operate an operating system (OS) and/or application programs to control a plurality of hardware and/or software components connected to the AP 1610 and perform data-processing and operations on multimedia data. For example, the AP 1610 may be implemented in the form of a system on chip (SoC). According to an embodiment of the present disclosure, the AP 1610 may include a graphic processing unit (GPU) (not shown).

The communication module 1620 (e.g., the communication interface 260) may perform data communication with other electronic devices (e.g., the electronic device 204 and the server 206) through a network. According to an embodiment of the present disclosure, the communication module 1620 may include a cellular module 1621, a Wi-Fi module 1623, a BT module 1625, a GPS module 1627, an NFC module 1628, and a radio frequency (RF) module 1629.

The cellular module 1621 is responsible for voice and video communication, text messaging, and Internet access services through a communication network (e.g., LTE, LTE-advanced LTE-A, code division multiple access (CDMA), wideband CMDA (WCDMA), universal mobile telecommunications system (UMTS), wireless broadband (WiBro), and Global System for Mobile Communications (GSM) networks). The cellular module 1621 may perform identification and authentication of electronic devices in the communication network using the SIM card 1624. According to an embodiment of the present disclosure, the cellular module 1621 may perform at least one of the functions of the AP 1610. For example, the cellular module 1621 may perform at least a part of the multimedia control function.

According to an embodiment of the present disclosure, the cellular module 1621 may include a CP. The cellular module 1621 may be implemented in the form of an SOC. Although the cellular module 1621 (e.g., a communication processor), the memory 1630, and the power management module 1695 are depicted as independent components separated from the AP 1610, the present disclosure is not limited thereto but may be embodied in a way that the AP includes at least one of the components (e.g., the cellular module 1621).

According to an embodiment of the present disclosure, each of the AP 1610 and the cellular module 1621 (e.g., a communication processor) may load a command or data received from at least one of the components on a non-volatile or volatile memory and process the command or data. The AP 1610 or the cellular module 1621 may store the data received from other components or generated by at least one of other components in the non-volatile memory.

Each of the Wi-Fi module 1623, the BT module 1625, the GPS module 1627, and the NFC module 1628 may include a processor for processing the data that each of the Wi-Fi module 1623, the BT module 1625, the GPS module 1627, and the NFC module 1628 transmits/receives. Although the cellular module 1621, the Wi-Fi module 1623, the BT module 1625, the GPS module 1627, and the NFC module 1628 are depicted as independent blocks, at least two of them (e.g., a communication processor corresponding to the cellular module 1621 and Wi-Fi processor corresponding to the Wi-Fi module 1623) may be integrated in the form of an SoC.

More specifically, Wi-Fi of the Wi-Fi module 1623 refers to a short-range communication network in which wireless Internet can be used within a predetermined range through a radio wave or infrared transmission scheme in a place where a wireless access device (access point: AP) is installed. The Wi-Fi module 1623 may allow the electronic device 1601 to receive the wireless communication network service based on a Wi-Fi scheme.

The RF module 1629 may transmit/receive data, for example, an RF signal. Although not illustrated in the drawing, the RF module 1629 may, for example, include a transceiver, a power amp module (PAM), a frequency filter, a low noise amplifier (LNA), a power amplifier (PA), a programmable gain amplifier (PGA), a local oscillator (LO), and the like. Further, the RF module 1629 may further include a component for transmitting and receiving electromagnetic waves in a free space in a wireless communication, for example, a conductor, a conductive wire, and the like. Further, the RF module 1629 may include one or more antennas. The application processor 1610 may form a wireless communication network between the electronic device 1601 and another electronic device through the antenna. The electronic device 1601 according to the present disclosure may determine a communication service provider based on the enabled profile by the application processor 1610 and allow one antenna to use a frequency band of the determined communication service provider.

In FIG. 16, although it is illustrated that the cellular module 1621, the Wi-Fi module 1623, the BT module 1625, the GPS module 1627, and the NFC module 1628 share one RF module 1629, at least one of the cellular module 1621, the Wi-Fi module 1623, the BT module 1625, the GPS module 1627, and the NFC module 1628 may transmit/receive an RF signal through a separate RF module according to an embodiment.

The SIM card 1624 may be designed so as to be inserted into a slot formed at a predetermined position of the electronic device. The SIM card 1624 may store unique identity information (e.g., ICCID) or subscriber information (e.g., IMSI).

The memory 1630 (e.g., the memory 230) may include at least one of an internal memory 1632 and an external memory 1634. The internal memory 1632 may include at least one of a volatile memory (e.g., a DRAM, an SRAM, an SDRAM or a non-volatile memory (e.g., a one time programmable read only memory (OTPROM), a programmable ROM (PROM), an Erasable and Programmable ROM (EPROM), an EEPROM, a mask ROM, a flash ROM, a NAND flash memory, a NOR flash memory, and the like).

According to an embodiment of the present disclosure, the internal memory 1632 may be a solid state drive (SSD). The external memory 1634 may be a flash drive, such as a compact flash (CF) drive, an SD card, a micro-SD card, a Mini-SD card, an xD card, a memory stick, and the like. The external memory 1634 may be connected to the electronic device 1601 through various interfaces functionally. According to an embodiment of the present disclosure, the electronic device 1601 may include a storage device (or a storage medium), such as a hard drive.

The sensor module 1640 may measure physical quantity or determine the operation status of the electronic device 1601 and convert the measured or determined information to an electric signal. The sensor module 1640 may include at least one of a gesture sensor 1640A, a Gyro sensor 1640B, a barometric sensor 1640C, a magnetic sensor 1640D, an acceleration sensor 1640E, a grip sensor 1640F, a proximity sensor 1640G, a color sensor 1640H (e.g., red, green, blue (RGB) sensor), a bio sensor 1640I, a temperature/humidity sensor 1640J, an illuminance sensor 1640K, and a ultra violet (UV) sensor 1640M. Additionally or alternatively, the sensor module 1640 may include E-nose sensor (not shown), electromyography (EMG) sensor (not shown), electroencephalogram (EEG) sensor (not shown), electrocardiogram (ECG) sensor (not shown), infrared (IR) sensor (not shown), iris sensor (not shown), and fingerprint sensor (not shown). The sensor module 1640 may further include a control circuit for controlling at least one of the sensors included therein.

The input device 1650 may include a touch panel 1652, a (digital) pen sensor 1654, keys 1656, and an ultrasonic input device 1658. The touch panel 1652 may be one of capacitive, resistive, infrared, microwave type touch panel. The touch panel 1652 may include a control circuit. In the case of the capacitive type touch panel, it is possible to detect physical contact or approximation. The touch panel 1652 may further include a tactile layer. In this case, the touch panel 1652 may provide the user with haptic reaction.

The (digital) pen sensor 1654 may be implemented with a sheet with the same or similar way as touch input of the user or a separate recognition sheet. The keys 1656 may include physical buttons, optical key, and keypad. The ultrasonic input device 1658 is a device capable of determining data by detecting sound wave through a microphone 1688 and may be implemented for wireless recognition. According to an embodiment of the present disclosure, the electronic device 1601 may receive the user input made by an external device (e.g., a computer or a server) connected through the communication module 1620.

The display 1660 (e.g., the display 250) may include a panel 1662, a hologram device 1664, and a projector 1666. The panel 1662 may be a LCD panel or an active matrix organic light emitting diodes (AMOLED) panel. The panel 1662 may be implemented so as to be flexible, transparent, and/or wearable. The panel 1662 may be implemented as a module integrated with the touch panel 1652. The hologram device 1664 may present 3-dimensional image in the air using interference of light. The projector 1666 may project an image to a screen. The screen may be placed inside or outside the electronic device. According to an embodiment of the present disclosure, the display 1660 may include a control circuit for controlling the panel 1662, the hologram device 1664, and the projector 1666.

The interface 1670 may include a high-definition multimedia interface (HDMI) 1672, a universal serial bus (USB) 1674, an optical interface 1676, and a D-subminiature (D-sub) 1678. The interface 1670 may include the communication interface 260 as shown in FIG. 2. Additionally or alternatively, the interface 1670 may include a Mobile high-definition link (MHL) interface, an SD/MMC card interface, and infrared data association (irDA) standard interface.

The audio module 1680 may convert sound to electric signal and vice versa. At least a part of the audio module 1680 may be included in the input/output interface 240 as shown in FIG. 2. The audio module 1680 may process the audio information input or output through a speaker 1682, a receiver 1684, an earphone 1686, and the microphone 1688.

The camera module 1691 is a device capable of taking still and motion pictures and, according to an embodiment of the present disclosure, includes at least one image sensor (e.g., front and rear sensors), a lens (not shown), and image signal processor (ISP) (not shown), and a flash (e.g., an LED or a xenon lamp) (not shown).

The power management module 1695 may manage the power of the electronic device 1601. Although not shown, the power management module 1695 may include a power management integrated circuit (PMIC), a charger integrated circuit (IC), a battery, and a battery or fuel gauge.

The PMIC may be integrated into an integrated circuit or an SoC semiconductor. The charging may be classified into wireless charging and wired charge. The charger IC may charge the battery and protect the charger against overvoltage or overcurrent. According to an embodiment of the present disclosure, the charger IC may include at least one of wired charger and wireless charger ICs. Examples of the wireless charging technology includes resonance wireless charging and electromagnetic wave wireless charging, and there is a need of extra circuit for wireless charging, such as coil loop, resonance circuit, and diode.

The battery gauge may measure the residual power of the battery 1696, charging voltage, current, and temperature. The battery 1696 may store or generate power and supply the stored or generated power to the electronic device 1601. The battery 1696 may include a rechargeable battery or a solar battery.

The indicator 1697 may display operation status of the electronic device 1601 or a part of the electronic device, booting status, messaging status, and charging status. The motor 1698 may converts the electronic signal to mechanical vibration. Although not shown, the electronic device 1601 may include a processing unit (e.g., a GPU) for supporting mobile TV. The processing unit for supporting the mobile TV may be able to processing the media data abiding by the broadcast standards such digital multimedia broadcasting (DMB), digital video broadcasting (DVB), and media flow.

As described above, the electronic device operating method and apparatus of the present disclosure is capable of providing diverse screen displays in adaptation to various conditions to implement optimal environment for utilizing the electronic device, resulting in improvement of user convenience. In addition, the electronic device operating method and apparatus of the present disclosure is advantageous in terms of facilitating navigation between folders by sorting the folders by hierarchical level.

Figure 17:
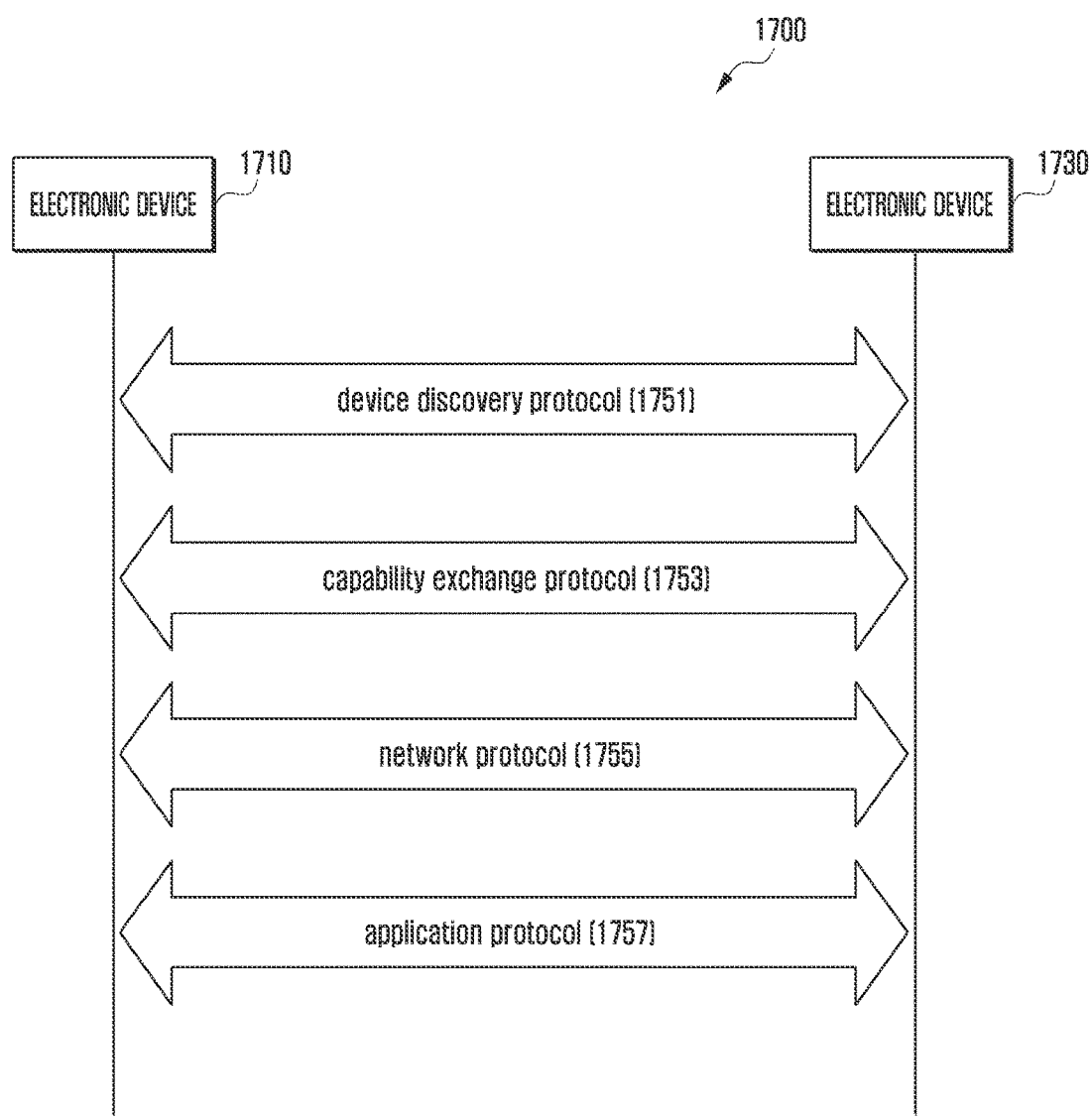
FIG. 17 illustrates a communication protocol between a plurality of electronic devices according to various embodiments of the present disclosure.

FIG. 17 illustrates a communication protocol between a plurality of electronic devices according to various embodiments of the present disclosure.

Referring to FIG. 17, for example, a communication protocol 1700 may include a device discovery protocol 1751, a capability exchange protocol 1753, a network protocol 1755, and an application protocol 1757.

According to an embodiment of the present disclosure, the device discovery protocol 1751 may be a protocol that allows the electronic devices (e.g., electronic devices 1710 and 1730) to detect an external electronic device capable of communicating therewith or connects the electronic devices to the detected external electronic device. For example, the electronic device 1710 (e.g., the electronic device 201) may detect the electronic device 1730 as a device which can communicate with the electronic device 1710 through a communication method (e.g., Wi-Fi, BT, USB, and the like) which can be used by the electronic device 1710 through the device discovery protocol 1751. For communication with the electronic device 1730, the electronic device 1710 may acquire and store identification information on the detected electronic device 1730 using the device discovery protocol 1751. For example, the electronic device 1710 may establish a communication connection with the electronic device 1730, based on at least the identification information.

According to some embodiments of the present disclosure, the device discovery protocol 1751 may be a protocol for mutual authentication between the plurality of electronic devices. For example, the electronic device 1710 may perform an authentication between the electronic device 1710 and the electronic device 1730 based on communication information (e.g., a media access control (MAC) address, a universally unique IDentifier (UUID), a subsystem IDentification (SSID), and an information provider (IP) address) for the connection with the electronic device 1730.

According to an embodiment of the present disclosure, the capability exchange protocol 1753 may be a protocol for exchanging information related to a service function that can be supported by at least one of the electronic devices 1710 and 1730. For example, the electronic device 1710 and the electronic device 1730 may mutually exchange information related to currently provided service functions through the capability exchange protocol 1753. The exchangeable information may include identification information indicating a particular service among a plurality of services which can be supported by the electronic device 1710 or the electronic device 1730. For example, the electronic device 1710 may receive, from the electronic device 1730, identification information of a particular service provided by the electronic device 1730 through the capability exchange protocol 1753.

In this case, the electronic device 1710 may determine whether the particular service can be supported by the electronic device 1710 itself based on the received identification information.

According to an embodiment of the present disclosure, the network protocol 1755 may be a protocol for controlling a flow of data transmitted/received to provide a service between the electronic devices (e.g., the electronic devices 1710 and 1730) connected to communicate with each other. For example, at least one of the electronic device 1710 and the electronic device 1730 may control an error or data quality using the network protocol 1755. Additionally or alternatively, the network protocol 1755 may determine a transmission format of data transmitted/received between the electronic device 1710 and the electronic device 1730. Further, at least one of the electronic device 1710 and the electronic device 1730 may manage at least a session (e.g., connect or terminate a session) for a data exchange between the electronic devices by using the network protocol 1755.

According to an embodiment of the present disclosure, the application protocol 1757 may be a protocol for providing a procedure or information for exchanging data related to a service provided to an external electronic device. For example, the electronic device 1710 (e.g., the electronic device 201) may provide a service to the electronic device 1730 through the application protocol 1757.

According to an embodiment of the present disclosure, the communication protocol 1700 may include a standard communication protocol, a communication protocol designated by an individual or organization (e.g., a communication protocol self-designated by a communication device maker or a network provider) or a combination thereof.

According to various embodiments of the present disclosure, the devices (e.g., modules or their functions) or methods may be implemented by computer program instructions stored in a computer-readable storage medium. In the case that the instructions are executed by at least one processor (e.g., the processor 220), the at least one processor may execute the functions corresponding to the instructions. The computer-readable storage medium may be the memory 230. At least a part of the programing module may be implemented (e.g., executed) by the processor 220. At least a part of the programing module may include modules, programs, routines, sets of instructions, and processes for executing the at least one function.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or programming module of the present disclosure may include at least one of the aforementioned components with omission of some components or addition of other components. The operations of the modules, programming modules, or other components may be executed in series, in parallel, recursively, or heuristically. In addition, some operations may be executed in different order, omitted, or extended with other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of changing a profile by using an identification module, the method comprising:
   identifying a network selected by a user;
   determining whether the profile, which uses the network, is included in the identification module in accordance with the identified network;
   downloading the profile corresponding to the network and enabling the downloaded profile when the profile is not included in the identification module;
   enabling the profile when the profile is included in the identification module; and
   making a connection to the network based on the enabled profile.

2. The method of claim 1,
   wherein the determining of whether the profile is included in the identification module comprises determining whether the profile is included in the identification module while being in an enabled state or a disabled state,
   wherein the making of the connection to the network comprises making the connection to the network based on the enabled profile when the profile is included in the identification module while being in the enabled state, and
   wherein the making of the connection to the network comprises disabling an existing profile in the enabled state and enabling the disabled profile when the profile is included in the identification module while being in the disabled state, and making the connection to the network based on the enabled profile.

3. The method of claim 1, wherein the downloading of the profile comprises:

making a connection to a profile acquisition link corresponding to the network; and
downloading a profile selected by the user based on the profile acquisition link.

4. The method of claim 3, wherein the making of the connection to the profile acquisition link comprises making the connection to the profile acquisition link based on a network corresponding to an existing profile in the enabled state or based on the network.

5. The method of claim 1, wherein the enabling of the downloaded profile comprises:
disabling an existing profile in the enabled state, and
enabling the downloaded profile.

6. The method of claim 5, further comprising, after the making of the connection to the network:
disabling the downloaded and enabled profile; and
enabling again the existing disabled profile.

7. The method of claim 1, wherein the network corresponds to a network, which allows a wireless communication network service provided by a particular communication service provider to be used based on the particular communication service provider, and provides a Wi-Fi network service or an embedded multimedia broadcast multicast service (eMBMS).

8. The method of claim 1, further comprising, when an embedded multimedia broadcast multicast service (eMBMS) is provided based on the connected network, providing the eMBMS based on a time division multiplexing scheme based on one embedded antenna or providing the eMBMS without a limitation on a scheme based on one predetermined antenna between two embedded antennas.

9. The method of claim 1, wherein the downloading of the profile comprises:
displaying a category for entering a profile acquisition link in a particular program or a setting menu;
displaying at least one country or communication service providers and networks which provide profiles in response to a user input for the displayed category; and
downloading the profiles corresponding to the user input for the at least one displayed country or communication service providers and networks.

10. The method of claim 9, wherein the downloading of the profiles corresponding to the user input comprises:
displaying a use period and a use fee in response to the user input for the at least one displayed country or communication service providers and networks;
performing payment based on the electronic device in response to a user input for the displayed use period and use fee; and
downloading a profile corresponding to the payment.

11. The method of claim 9, wherein the downloading of the profiles corresponding to the user input comprises:
displaying at least one service program and service use fee which is provided in response to the user input for the at least one displayed country or communication service providers and networks;
performing payment based on the electronic device in response to a user input for the displayed service program and service use fee; and
downloading a profile corresponding to the payment.

12. At least one non-transitory computer readable recording medium for storing a computer program configured to be readable by at least one processor for instructing the at least one processor to execute a computer process for performing the method of claim 1.

13. An electronic device comprising:
a communication device configured to:
download a profile, and
make a connection to a network;
an identification module configured to store the downloaded profile; and
a processor configured to:
identify the network,
determine whether a profile, which uses the network, is included in the identification module in accordance with the identified network,
download the profile corresponding to the network through the communication device and enable the downloaded profile when the profile is not included in the identification module,
enable the profile when the profile is included in the identification module, and
make a connection to the network based on the enabled profile.

14. The electronic device of claim 13,
wherein the processor is further configured to determine whether the profile is included in the identification module while being in an enabled state or a disabled state,
wherein, when the profile is included in the identification module while being in the enabled state, the processor is further configured to make the connection to the network based on the enabled profile, and
wherein, when the profile is included in the identification module while being in the disabled state, the processor is further configured to disable an existing profile in the enabled state and enable the disabled profile, and make the connection to the network based on the enabled profile.

15. The electronic device of claim 13, further comprising a display configured to:
detect a user's selection, and
display a profile acquisition link,
wherein the processor is further configured to:
make a connection to the profile acquisition link corresponding to the network, and
download a profile selected by the user based on the profile acquisition link.

16. The electronic device of claim 15, wherein the processor is further configured to make the connection to the profile acquisition link based on a network corresponding to an existing profile in the enabled state or based on the network.

17. The electronic device of claim 13, wherein the processor is further configured to:
disable an existing profile in the enabled state, and
enable the downloaded profile.

18. The electronic device of claim 17, wherein, after the connection to the network, the processor is further configured to:
disable the downloaded and enabled profile, and
enable again the existing disabled profile.

19. The electronic device of claim 13, wherein, when an embedded multimedia broadcast multicast service (eMBMS) is provided based on the connected network, the processor is further configured to:
provide the eMBMS based on a time division multiplexing scheme based on one embedded antenna, or
provide the eMBMS without a limitation on a scheme based on one predetermined antenna between two embedded antennas.

* * * * *